United States Patent
Maaref et al.

(10) Patent No.: US 10,680,734 B2
(45) Date of Patent: Jun. 9, 2020

(54) SYSTEM AND METHOD FOR INTERFERENCE CANCELLATION USING TERMINAL COOPERATION

(71) Applicant: Huawei Technologies Co., Ltd., Shenzhen (CN)

(72) Inventors: Amine Maaref, Kanata (CA); Jianglei Ma, Ottawa (CA); Peiying Zhu, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/215,181

(22) Filed: Dec. 10, 2018

(65) Prior Publication Data

US 2019/0109662 A1    Apr. 11, 2019

Related U.S. Application Data

(60) Division of application No. 15/269,178, filed on Sep. 19, 2016, now Pat. No. 10,153,858, which is a
(Continued)

(51) Int. Cl.
*H04J 11/00* (2006.01)
*H04W 72/12* (2009.01)
(Continued)

(52) U.S. Cl.
CPC ....... *H04J 11/0026* (2013.01); *H04J 11/0053* (2013.01); *H04W 72/1226* (2013.01);
(Continued)

(58) Field of Classification Search
CPC ............. H04J 11/0026; H04J 11/0053; H04W 72/1226; H04W 72/1278; H04W 88/04; H04W 76/14
See application file for complete search history.

(56) References Cited

U.S. PATENT DOCUMENTS

| | | | |
|---|---|---|---|
| 2012/0213183 A1* | 8/2012 | Chen ................. | H04W 72/1278 370/329 |
| 2012/0300662 A1* | 11/2012 | Wang ................... | H04W 72/02 370/252 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)" 3GPP TS 36.213 v11.1.0, 160 pages, Dec. 2012.
(Continued)

*Primary Examiner* — Ping Y Hsieh
(74) *Attorney, Agent, or Firm* — Slater Matsil, LLP

(57) ABSTRACT

Soft information for achieving interference cancellation in downlink transmissions can be communicated over device-to-device (D2D) links, thereby allowing paired user equipments (UEs) to receive downlink transmissions over the same radio resources. More specifically, paired UEs that receive transmissions over the same time-frequency resources may exchange soft or hard information over D2D links in order to facilitate interference cancellation. The D2D links may be unidirectional or bidirectional, and may be established over in-band or out-of-band resources. Paired UEs may be in the same or different cells, and may receive their respective transmissions from the same or different transmit point. UEs may be paired with one another based on various criteria, e.g., interference cancellation capabilities, scheduling metrics, etc.

18 Claims, 22 Drawing Sheets

Related U.S. Application Data continuation of application No. 14/106,682, filed on Dec. 13, 2013, now Pat. No. 9,480,081.

(60) Provisional application No. 61/790,453, filed on Mar. 15, 2013.

(51) Int. Cl.
*H04W 76/14* (2018.01)
*H04W 88/04* (2009.01)

(52) U.S. Cl.
CPC ....... *H04W 72/1278* (2013.01); *H04W 76/14* (2018.02); *H04W 88/04* (2013.01)

(56) References Cited

U.S. PATENT DOCUMENTS

| | | | |
|---|---|---|---|
| 2013/0150061 A1 | 6/2013 | Shin et al. | |
| 2013/0163532 A1* | 6/2013 | Anderson | H04W 72/04 370/329 |
| 2014/0198694 A1* | 7/2014 | Yang | H04W 52/242 370/311 |
| 2015/0139004 A1* | 5/2015 | Fodor | H04W 72/082 370/252 |
| 2015/0173088 A1* | 6/2015 | Kim | H04W 76/14 370/329 |
| 2015/0195842 A1* | 7/2015 | Fan | H04W 72/082 370/329 |
| 2015/0237646 A1* | 8/2015 | Huang | H04W 72/1226 370/280 |

OTHER PUBLICATIONS

Chang, R., et al, "Dynamic Fractional Frequency Reuse (D-FFR) for Multicell OFDMA Networks Using a Graph Framework," Wireless Communications and Mobile Computing, vol. 13, No. 1, pp. 12-27, Jan. 2013.

Chang, R., et al., "Multicell OFDMA Downlink Resource Allocation Using a Graphic Framework," IEEE Transactions on Vehicular Technology, Sep. 2009, vol. 58, No. 7, pp. 3494-3507.

Mao, X. et al., "Adaptive Soft Frequency Reuse for Inter-Cell Interference Coordination in SC-FDMA Based 3GPP LTE Uplinks," IEEE Global Telecommunications Conference, Nov. 30, 2008-Dec. 4, 2008, pp. 1-6.

Sadr, S., et al., "Hierarchical Resource Allocation in Femtocell Networks using Graph Algorithms," IEEE Conference on Communications, Ottawa, CA, Jun. 10-15, 2012, pp. 281-286.

Spencer, Q., et al., "An Introduction to the Multi-User MIMO Downlink," Oct. 2004, IEEE 0163-6804/04, pp. 60-67.

Uygungelen, S. et al., "Graph-Based Dynamic Frequency Reuse in Femtocell Networks," IEEE 73rd Vehicular Technology Conference (VTC Spring), May 15-18, 2011, pp. 1-6.

\* cited by examiner

SYSTEM AND METHOD FOR INTERFERENCE CANCELLATION USING TERMINAL COOPERATION

This application is a divisional of U.S. patent application Ser. No. 15/269,178 filed on Sep. 19, 2016, which is a continuation of U.S. patent application Ser. No. 14/106,682 filed on Dec. 13, 2013, which claims priority to U.S. Provisional Application No. 61/790,543 filed on Mar. 15, 2013, all of which are incorporated herein by reference as if reproduced in their entireties.

TECHNICAL FIELD

Embodiments of this disclosure relate to a system and method for wireless communications, and, in particular embodiments, to a system and method for interference cancellation using terminal cooperation.

BACKGROUND

Cellular networks often mitigate downlink interference by assigning different radio frequency resources to different users. For example, in long term evolution (LTE) networks, enhanced base stations (eNBs) communicate downlink signals over different time-frequency resources to avoid interference amongst the various user equipments (UEs). Access points in other networks may communicate downlink signals using different spatial and/or coding resources to mitigate interference among users. Radio resources are finite in nature, and therefore the telecommunications industry is consistently seeking new and innovative techniques for more efficient radio resource utilization.

SUMMARY OF THE INVENTION

Technical advantages are generally achieved by embodiments of this disclosure which describe systems and methods for interference cancellation using terminal cooperation.

In accordance with an embodiment, a method for achieving interference cancellation in a wireless network is provided. In this example, the method includes receiving a signal carrying a first transmission and a second transmission. The first transmission is communicated over the same radio resources as the second transmission. The method further includes communicating information over a device to device (D2D) link extending between a first UE and a second UE. The information is used to decode either the first transmission or the second transmission in accordance with an interference cancellation technique. An apparatus for performing this method is also provided.

In accordance with another embodiment, a method of pairing user equipments for coordinated interference cancellation is provided. In this example, the method includes identifying a plurality of user equipments (UEs) residing in one or more coverage areas of one or more transmit points (TPs), and pairing a first UE with a second UE. The first UE is scheduled to receive a first transmission over the same radio resource in which the second UE is scheduled to receive a second transmission. The method further includes prompting the first UE and the second UE to exchange information over a device to device (D2D) link. The information exchanged over the D2D link is used to decode the first transmission, the second transmission, or both in accordance with an interference cancellation technique. An apparatus for performing this method is also provided.

BRIEF DESCRIPTION OF THE DRAWINGS

For a more complete understanding of embodiments of this disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that embodiments of this disclosure provide many applicable inventive concepts that can be embodied in a wide variety of specific contexts. The specific embodiments discussed are merely illustrative of specific ways to make and use the embodiments of this disclosure, and do not limit the scope of the claims.

Aspects of this disclosure achieve interference cancellation for downlink transmission by communicating soft information over device-to-device (D2D) links, thereby allowing multiple user equipments (UEs) to receive downlink transmissions over the same radio resources. More specifically, paired UEs that receive transmissions over the same time-frequency resources are configured to exchange soft or hard information over D2D links in order to facilitate interference cancellation. The D2D links may be unidirectional or bidirectional, and may be established over in-band or out-of-band resources. Paired UEs may be in the same or different cells, and may receive their respective transmissions from the same or different transmit point. UEs may be similar in structure and operation (e.g., operated by a user entity, capable of mobile communication, etc.), and may be paired with one another based on various criteria, e.g., proximity, interference cancellation capabilities, scheduling metrics, etc. For example, UEs that are in close proximity may be paired with one another, as these UEs may be capable of establishing efficient D2D links. These and other aspects of this disclosure are discussed in greater detail below. Two or more UEs that participate in D2D communication with one another may be referred to as paired (or co-paired) UEs.

Figure 1:
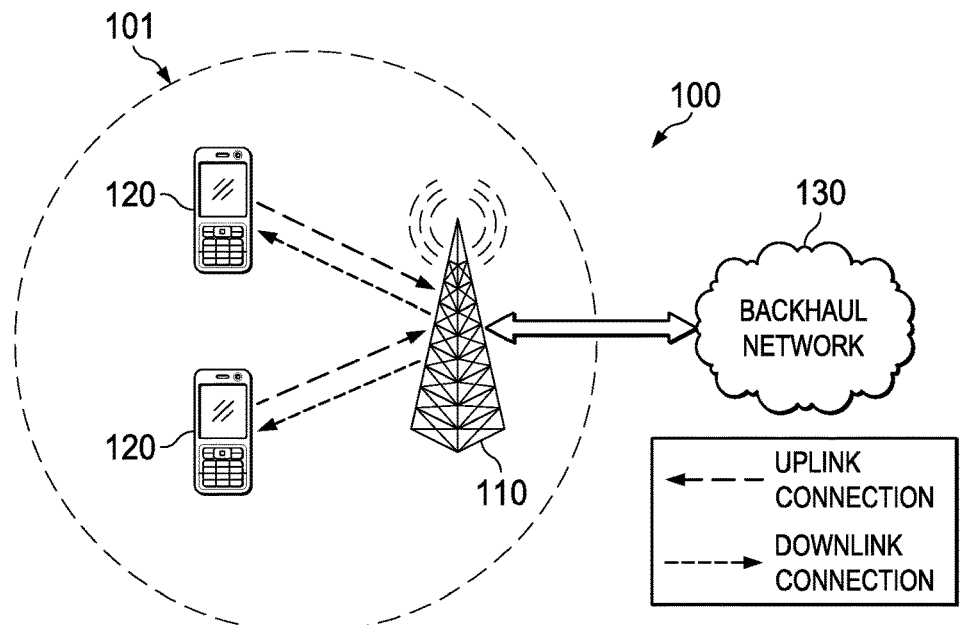
FIG. 1 illustrates a diagram of an embodiment network for communicating data.

FIG. 1 illustrates a network 100 for communicating data. The network 100 comprises an access point (AP) 110 having a coverage area 101, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110, e.g., a mobile phone, a tablet, personal computer (PC) having a wireless adapter, etc. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
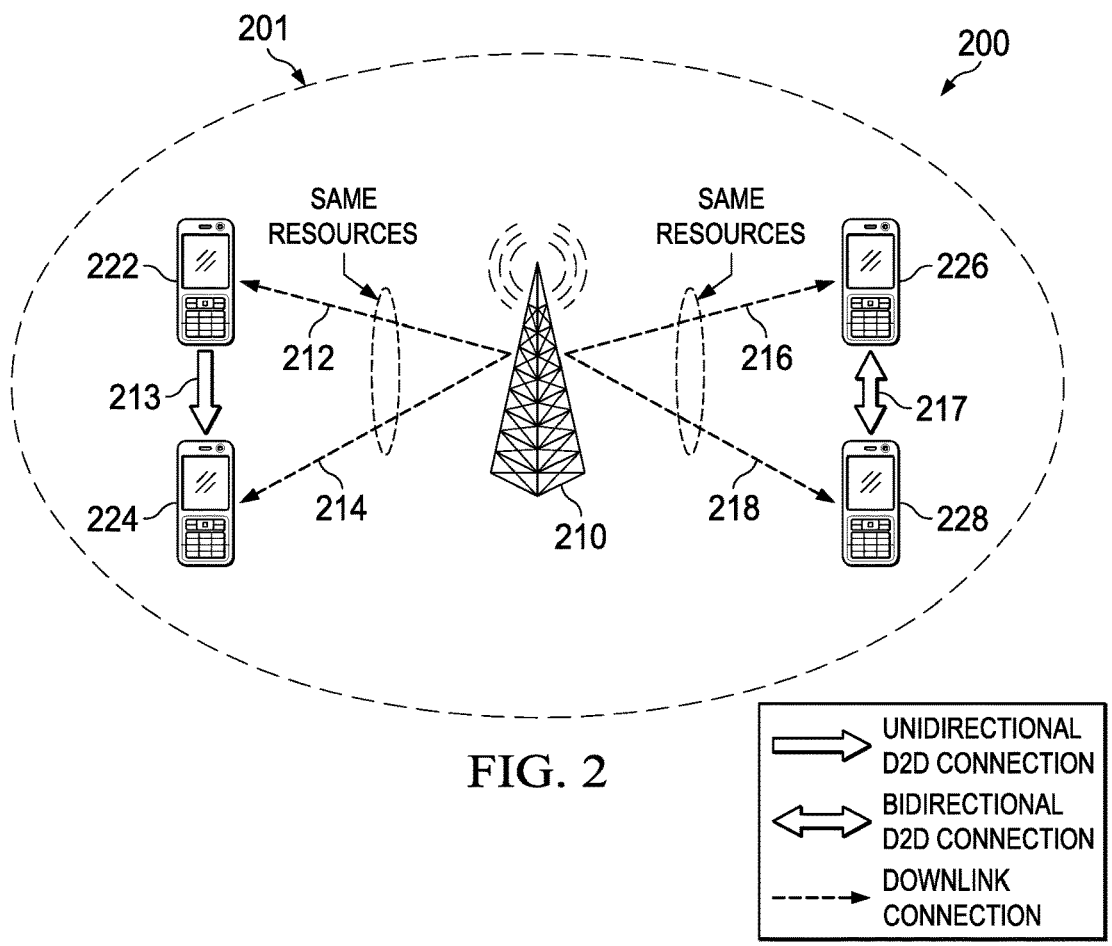
FIG. 2 illustrates a diagram of another embodiment network for communicating data.

FIG. 2 illustrates a network 200 for communicating data in accordance with an interference cancellation technique. The network 200 comprises an access point (AP) 210 having a coverage area 201, a plurality of user equipments (UEs) 222, 224, 226 and 228. As shown, the UE 222 is paired with the UE 224, and the UE 226 is paired with the UE 228. AP 210 uses a first set of radio resources to communicate downlink transmissions 212, 214 to the paired UEs 222, 224, and uses a second set of radio resources to communicate downlink transmissions 216, 218 to the paired UEs 226, 228. Hence, the downlink transmission 212 is communicated over the same radio resources as the downlink transmission 214, and the downlink transmission 216 is communicated over the same radio resources as the downlink transmission 218. Paired UEs may be configured to communicate "soft" or "hard" information over unidirectional or bidirectional D2D links for the purpose of achieving interference cancellation. "Hard" information may include information used for hard interference cancellation (e.g., decoded bits of an earlier transmission, etc.), while "soft" information may include information used for soft interference cancellation (e.g., log-likelihood ratios, etc.). In this example, the UE 222 is configured to communicate soft or hard information to the UE 224 over a unidirectional D2D link 213, while the UEs 226, 228 are configured to exchange soft or hard information with one another over the bidirectional D2D link 217. The D2D links 213, 217 may be established over in-band resources (e.g., the same resources used by the access network) or out-of-band (OOB) resources (e.g., resources not directly used by the access network). The UEs 222-228 may use any communication protocol to communicate over the D2D links 213, 217, e.g., LTE, Wi-Fi, Zigbee, Bluetooth, etc.

Figure 3:
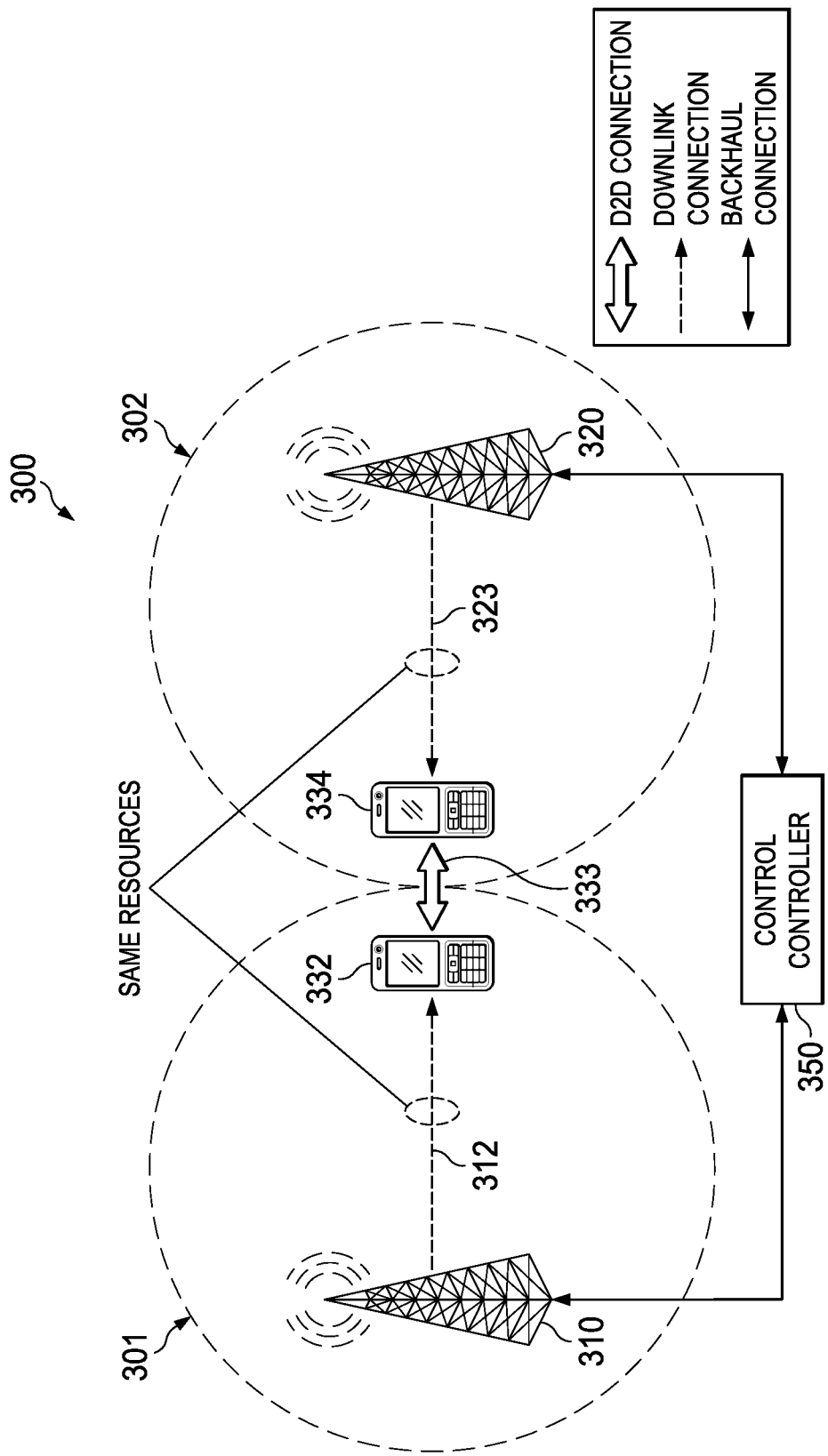
FIG. 3 illustrates a diagram of yet another embodiment network for communicating data.

Paired UEs can be located in different cells. FIG. 3 illustrates a network 300 for communicating data in accordance with an interference cancellation technique. The network 300 comprises an AP 310 having a coverage area 301, an AP 320 having a coverage area 302, and a pair of UEs 332 and 334. As shown, the APs 310, 320 communicate downlink transmissions 312, 323 to the UEs 332, 334 using the same radio resources. The UEs 332, 334 are configured to communicate soft or hard information over a D2D link 333. While the D2D link 333 is depicted as bi-directional, it may be unidirectional in some embodiments. In some embodiments, UE pairings and/or scheduling may be handled by a centralized controller 350. In other embodiments, the APs 310, 320 may handle UE pairing and/or scheduling in a distributed fashion.

Figure 4:
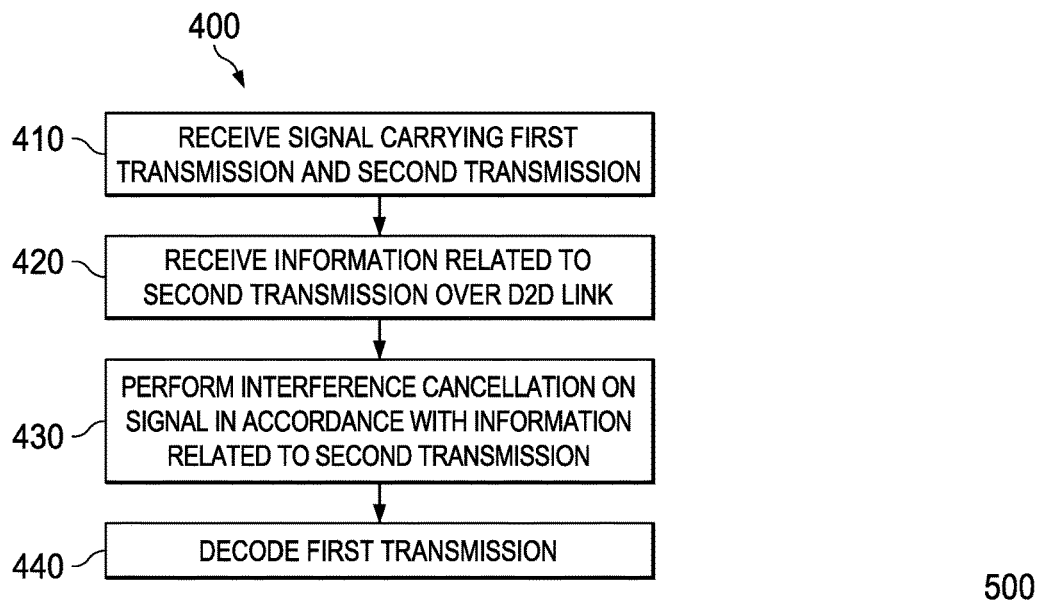
FIG. 4 illustrates a flowchart of an embodiment method for performing interference cancellation using information communicated over a D2D link.

In some embodiments, paired UEs are configured to exchange hard or soft information over D2D links in order to achieve interference cancellation. FIG. 4 illustrates a method 400 for performing interference cancellation in accordance with information communicated over a D2D link, as might be performed by a paired UE. As shown, the method 400 begins with step 410, where the paired UE receives a signal carrying a first transmission and a second transmission. Thereafter, the method 400 proceeds to step 420, where the paired UE receives information related to the second transmission over a D2D link. The information may be communicated by the other paired UE, and may include hard or soft information related to the second transmission. Subsequently, the method 400 proceeds to step 430, where the paired UE performs interference cancellation on the signal in accordance with the information received over the D2D link. More specifically, the paired UE performs interference cancellation to remove interference attributable to the second transmission from the signal, thereby separating the first transmission from the second transmission. Next, the method 400 proceeds to step 440, where the paired UE decodes the first transmission.

Figure 5:
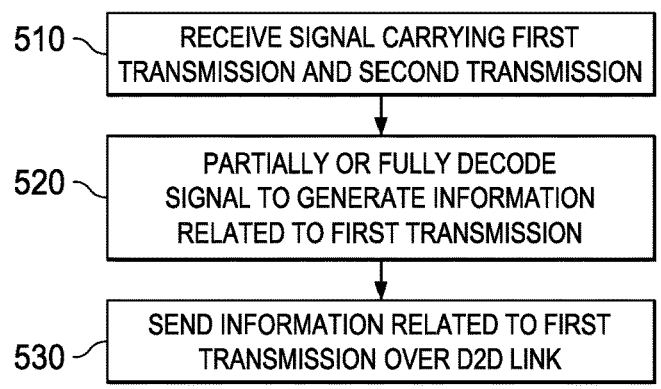
FIG. 5 illustrates a flowchart of an embodiment method for facilitating interference cancellation by forwarding information over a D2D link.

FIG. 5 illustrates a method 500 for forwarding information over a D2D link to facilitate interference cancellation, as might be performed by a paired UE. As shown, the method 500 begins with step 510, where the paired UE receives a signal carrying a first transmission and a second transmission. Thereafter, the method 500 proceeds to step 520, where the paired UE partially or fully decodes the signal to generate information related to the first transmission. Subsequently, the method 500 proceeds to step 530, where the paired UE sends information related to the first transmission over a D2D link. The information may be hard or soft information related to the first transmission, and may be used by the corresponding paired UE to decode the second transmission in accordance with an interference cancellation technique.

Figure 6:
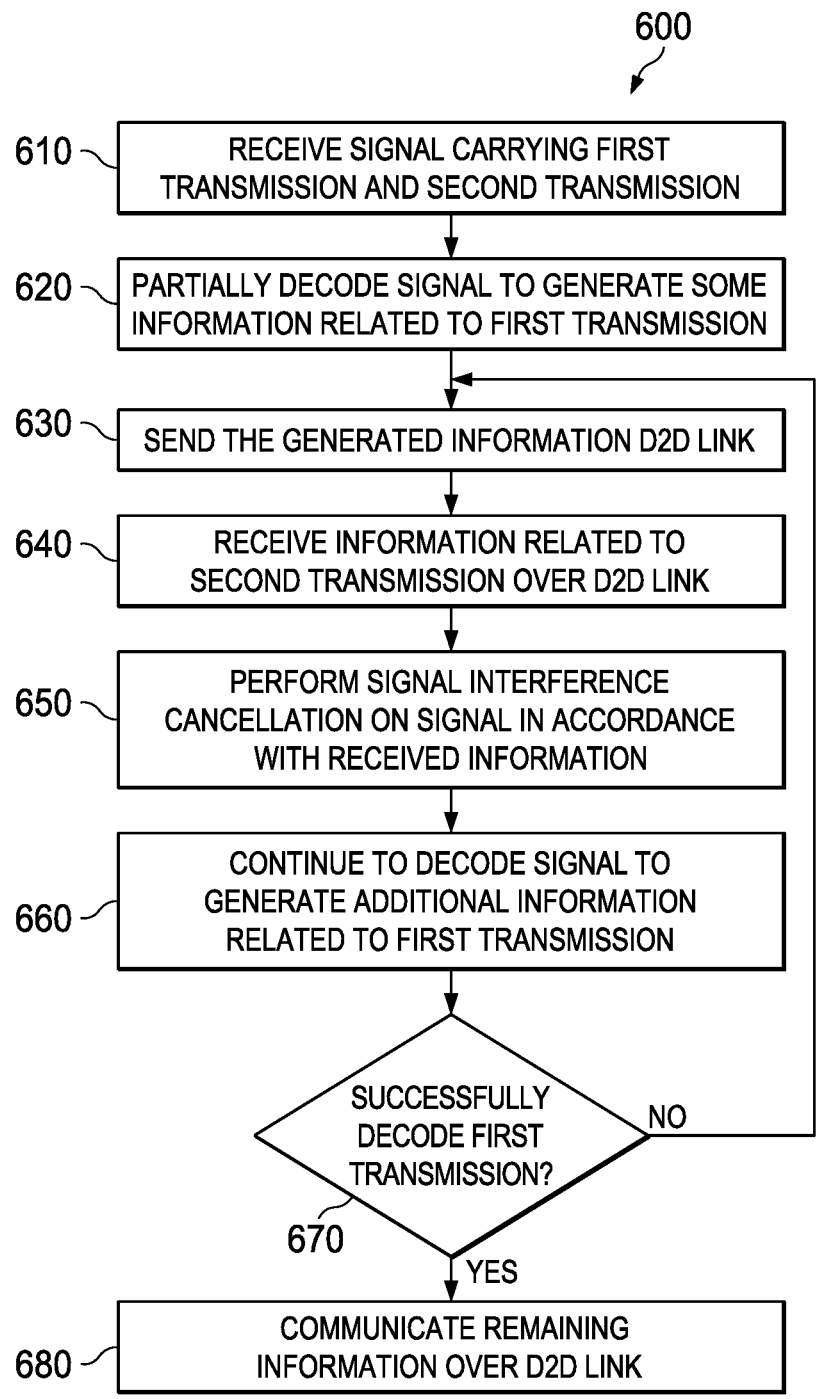
FIG. 6 illustrates a flowchart of an embodiment method for iteratively performing interference cancellation using information communicated over a D2D link.

In some embodiments, interference cancellation may be performed iteratively, and information related to the respective transmissions may be communicated over the D2D link multiple times. FIG. 6 illustrates a method 600 for performing/facilitating an iterative interference cancellation technique using information exchanged over a D2D link, as might be performed by a paired UE. As shown, the method 600 begins with step 610, where the paired UE receives a signal carrying a first transmission and a second transmission. Thereafter, the method 600 proceeds to step 620, where the paired UE partially decodes the signal to generate at least some information related to the first transmission. Subsequently, the method 600 proceeds to step 630, where the paired UE sends the generated information over a D2D link. Next, the method 600 proceeds to step 640, where the paired UE receives information related to the second transmission over the D2D link. Thereafter, the method 600 proceeds to step 650, where the paired UE performs signal interference cancellation on the signal in accordance with the information related to the second transmission. Subsequently, the method 600 proceeds to step 660, where the paired UE continues to decode the signal to generate additional information related to the first transmission. Next, the method 600 proceeds to step 670, where the paired UE determines whether or not the first transmission was successfully decoded. If the first transmission was successfully decoded, then the method 600 proceeds to step 680, where the paired UE communicates any remaining information related to the first transmission over the D2D link. If the first transmission was not successfully decoded, then the method 600 reverts back to steps 630-660 for an additional iteration of interference cancellation and decoding.

Figure 7:
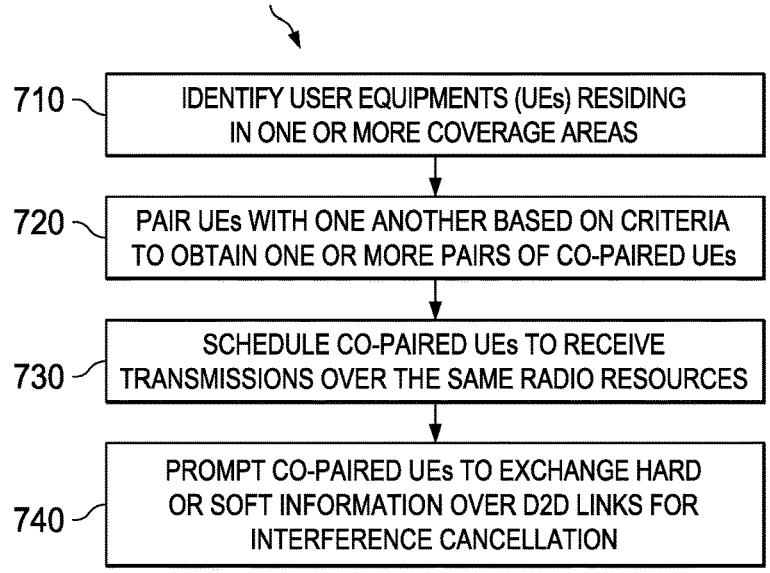
FIG. 7 illustrates a flowchart of an embodiment method for scheduling resources to co-paired UEs.

In some embodiments, a scheduler may pair UEs and schedule resources for transmissions to paired UEs to increase spectral efficiency in a network. FIG. 7 illustrates a method 700 for scheduling resources to paired UEs, as might be performed by a scheduler or base station. As shown, the method 700 begins at step 710, where the scheduler identifies UEs residing in one or more coverage areas. Next, the method 700 proceeds to step 720, where the scheduler pairs UEs with one another based on criteria to obtain one or more pairs of paired UEs. The criteria may include interference cancellation capabilities of the UEs or scheduling metrics of the network. Interference cancellation capabilities of the UEs may include whether or not the UEs are configured to perform interference cancellation as well as the proximity of appropriately configured UEs to one another, e.g., whether the UEs are close enough to establish a D2D link. UE pairing metrics may include signal-to-interference-and-noise ratios (SINR)s, geometries, pathloss gains to the APs, etc. Scheduling metrics may include variants of proportional-fair scheduler (PF), max-SINR scheduler, etc. Next, the method 700 may proceed to step 730, where the scheduler may schedule paired UEs to receive transmissions over the same radio resources. The radio resources may be any network resource used to transport data, e.g., time-frequency resources, coding resources, spatial resources, etc. Thereafter, the method 700 may proceed to step 740, where the scheduler may prompt paired UEs to exchange hard or soft information over D2D links in order to perform interference cancellation in accordance with aspects of this disclosure.

Figure 8:
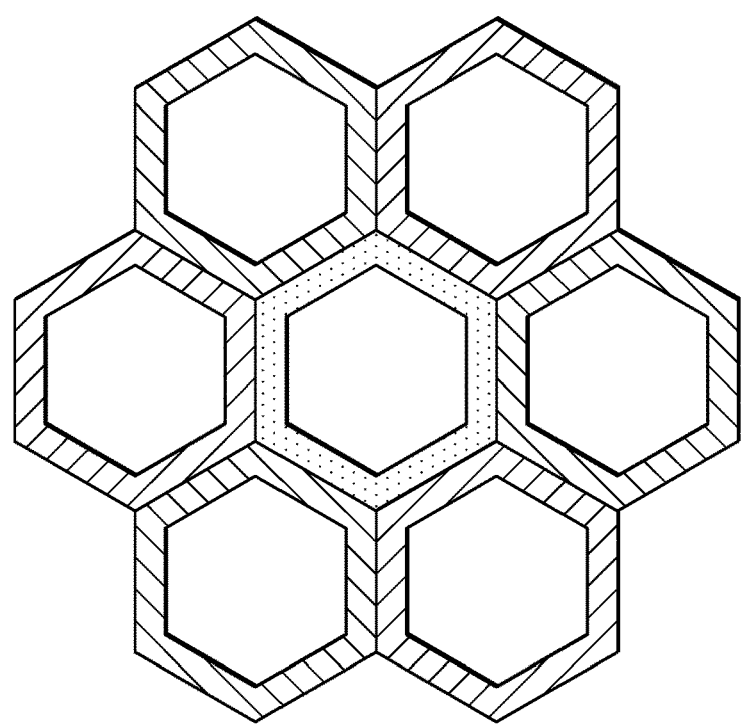
FIG. 8 illustrates a diagram of an embodiment network configured for frequency reuse.

In some embodiments, cells may be configured to communicate in accordance with a frequency reuse scheme, and reuse factors may be assigned such that a cell center is assigned a lower reuse factor than a cell edge. FIG. 8 illustrates an embodiment network configured for frequency reuse. As shown, the available spectrum is divided into two reserved parts: a cell-edge band and a cell-center band. Users located with a threshold distance to the TP are assigned frequencies in the cell-center band, while users located more than a threshold distance from the TP are assigned frequencies in the cell-edge band. Cell-center users can also have access to the cell-edge band, but with lower priority than cell-edge users.

Figure 9:
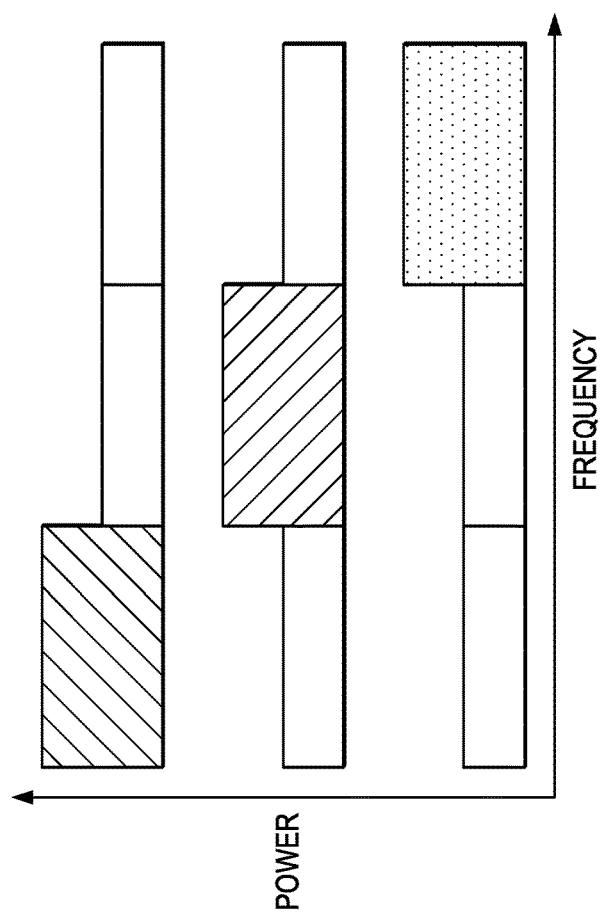
FIG. 9 illustrates a chart of fractional frequency reuse partitions.

In some embodiments, hard frequency reuse partitions may be used to avoid inter-cell interference. For example, hard frequency reuse partitions may divide a geographical area into n regions, each of which uses a dedicated portion of the available bandwidth so as to avoid inter-cell interference. Cells that are a sufficient distance away from each other may reuse the same frequency, resulting in reduced spectral efficiency. Conventional systems implement fractional frequency reuse (FFR), as shown by the graph in FIG. 9. With FFR, the cell centers of neighboring cells share the same band, while neighboring cell edges use non-overlapping orthogonal bands. The cell-center and cell-edge bands in a cell are non-overlapping.

Figure 10:
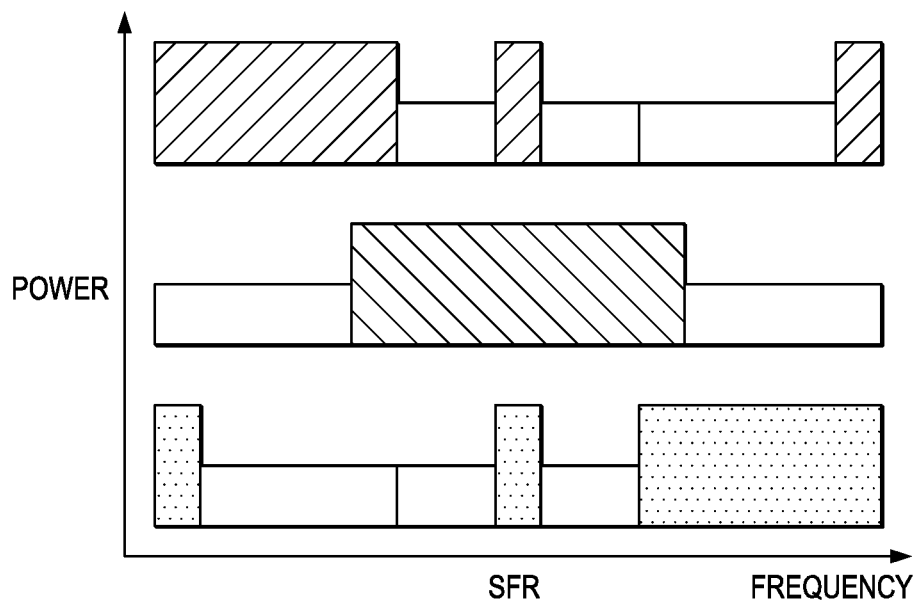
FIG. 10 illustrates a chart of embodiment soft frequency reuse partitions.
Figure 11:
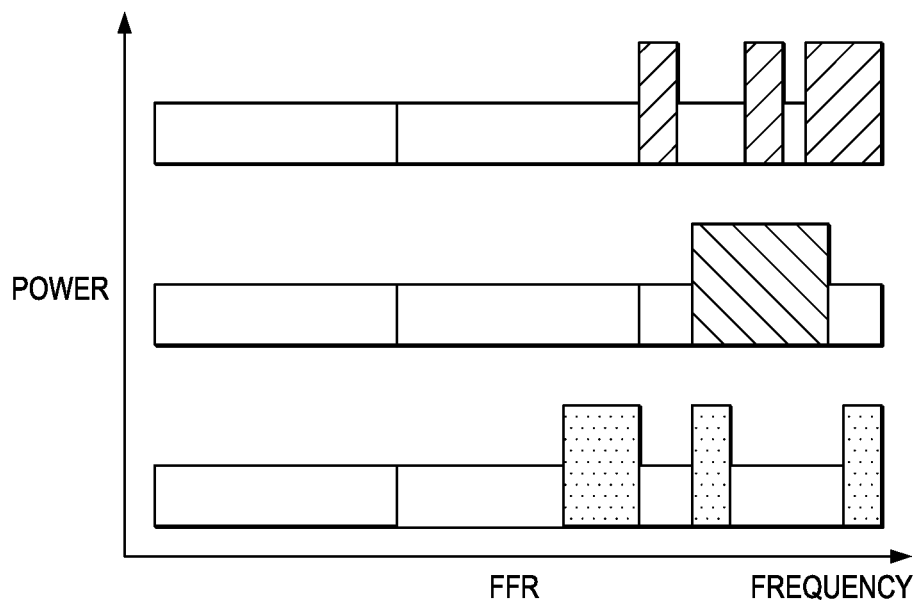
FIG. 11 illustrates a chart of embodiment fractional frequency reuse partitions.

Aspects of this disclosure provide distributed scheduling for IC-aware frequency reuse, which enhances inter-cell interference coordination (ICIC) to allow exploitation of interference cancellation via UE cooperation. FIG. 10 illustrates a graph of embodiment soft frequency reuse partitions. FIG. 11 illustrates a graph of embodiment fractional frequency reuse partitions.

Current wireless cellular network ICIC solutions orthogonalize radio frequency resources allocated to cell edge terminals in adjacent cells. Frequency resource orthogonization lowers the inter-cell interference experienced by cell-edge UEs at the cost of increasing the frequency reuse factor, thereby decreasing the throughput. An embodiment provides terminal side cooperation, where cell edge UEs belonging to neighboring cells can cancel out each other's interference if they are assigned to the same frequency resources. An embodiment provides an interference cancellation-aware ICIC solution that uses a graph coloring approach to allocate resources in a heterogeneous network (HetNet).

An embodiment system and method providing IC-aware radio frequency resource allocation in, e.g., 5G small cell networks, exploits interference cancellation through device-to-device (D2D) communications, sometimes referred to as direct mobile communications (DMC), in order to enhance the coverage and throughput performance of a wireless cellular network. An embodiment provides a flexible radio frequency reuse/allocation scheme that exploits interference cancellation capabilities enabled by UE cooperation in wireless cellular networks.

Typical ICIC solutions are oblivious of IC capabilities at the terminal side. Moreover, ICIC solutions (e.g., SFR and FFR), currently implemented in 4G networks (e.g., LTE/WiMAX), are not compatible with such methods. In an embodiment, user equipment (UE) cooperation at the terminal side provides a new degree of freedom to perform IC. Embodiments may be implemented in wireless networks, such as HetNets, 5G virtualized radio access networks, and the like, and devices, such as UEs and access points.

An embodiment provides an IC-aware graph coloring approach for radio frequency reuse in small cell networks (SCNs). An embodiment provides a flexible radio resource allocation scheme, and accounts for interference cancellation capabilities enabled by direct mobile communications. An embodiment improves both coverage and throughput.

For D2D interference cancellation, UEs are paired for interference cancellation purposes. Paired UEs share the same resources, similar to multi-user multiple-input and multiple-output (MU-MIMO), or MIMO co-pairing. Cell-edge UEs in the same or adjacent cells can reuse the same frequency resources. An embodiment decreases the frequency reuse factor, and improves the sum throughput. An embodiment reduces inter-cell interference and provides improved coverage.

D2D changes the inter-cell interference issue because UEs within range that can communicate with each other (even though they might belong to different cells) actually can use the same radio resources without interfering with each other by using interference cancellation techniques.

Radio resource allocation in an SCN using OFDMA is complex, and may be classified as a non-deterministic polynomial-time hard (NP-hard) problem. A sub-optimal but efficient way to solve this problem includes implementing an embodiment centralized IC-aware radio resource management (RRM) scheme. In accordance with long-term channel statistics, the scheme determines the minimum number of resource blocks (RBs) to be assigned to each transmit point (TP) so that all connected UEs meet their minimum required rates. The centralized scheduling scheme constructs an IC-aware interference graph of the SCN where each UE is represented by as many vertices as the number of allocated RBs. RB resource allocation then includes coloring the IC-aware interference graph so that any two interfering vertices (connected by an edge) are not assigned the same color.

Figure 12:
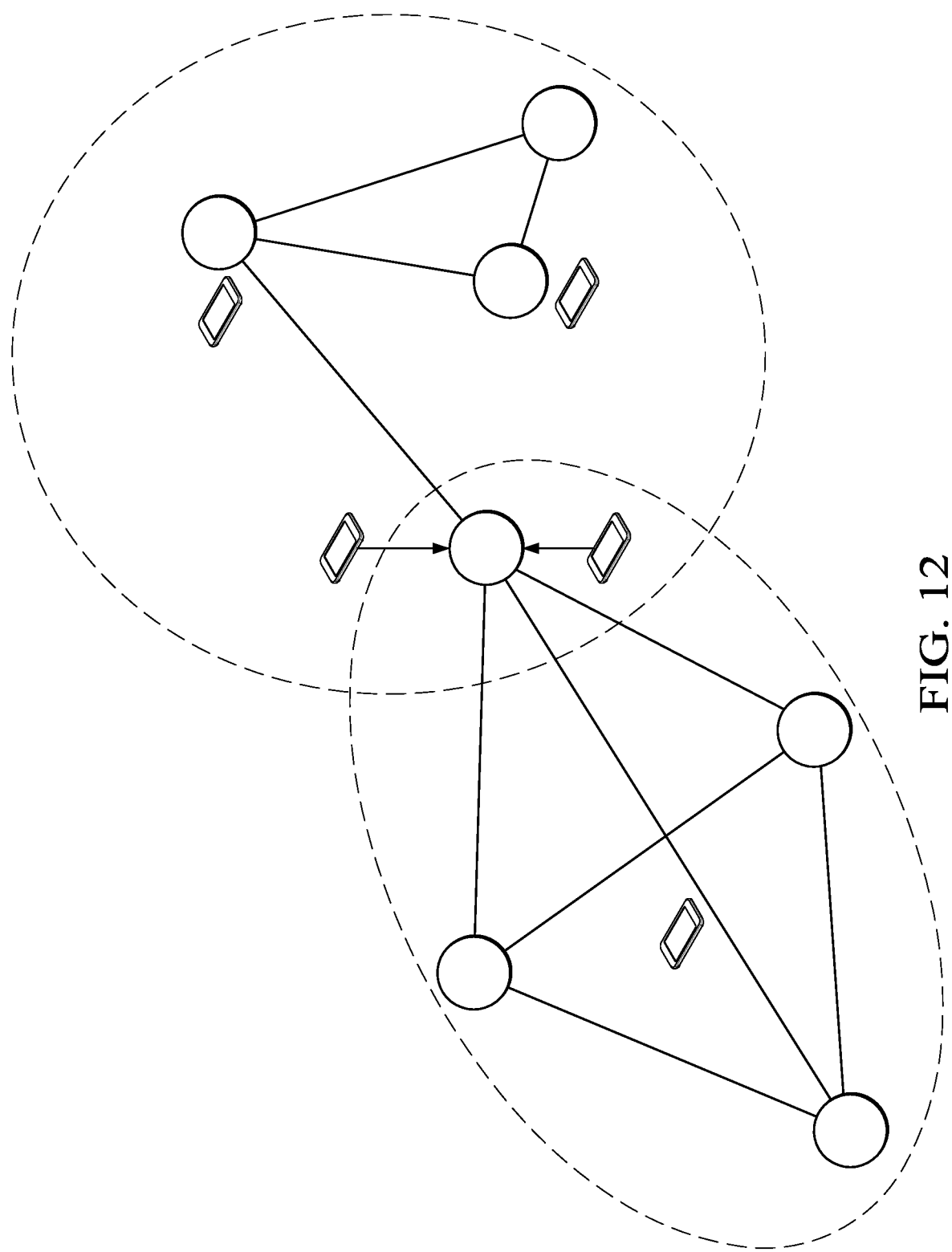
FIG. 12 illustrates a diagram of an IC-aware interference graph.

FIG. 12 illustrates an IC-aware interference graph. Each UE is represented in the graph by as many vertices as the number of assigned RBs. An edge connects two vertices if the corresponding TPs interfere with each other. RBs allocated to the same UE are connected (form a complete sub-graph). If some UEs can cancel each other's interference out, then their corresponding vertices should not be connected by an edge even though their serving TP(s) might interfere. By coloring the interference graph using well-known graph coloring algorithms, inter-TP interference is minimized while spatial frequency reuse is improved because of the D2D-enabled IC.

Similar to MU-MIMO pairing, UEs are paired for interference cancellation. This impacts scheduler design; the specific UEs that should be paired together depend on UE interference cancellation capability as well as the scheduling metrics. It also impacts signaling overhead; paired UEs should be aware of each other (e.g., with an interfering UE indicator).

There are multiple interference cancellation types. If paired $UE_1$ is able to decode its own signal, it forwards the decoded signal to its paired $UE_2$ via the D2D link. If paired $UE_1$ is not able to decode its own signal, it may send soft information along with the channel via the D2D link. Using a combination of soft information obtained from D2D and cellular links, paired $UE_2$ decodes the signal targeted to $UE_1$ and then cancels this interference from its own received signal. Multiple iterations are possible up to a maximum number of iterations.

An embodiment provides downlink/uplink interference cancellation via D2D direct communication. With unidirectional interference cancellation, $UE_1$ served by $TP_1$ sends its decoded signal to $UE_2$ served by $TP_2$ via D2D link, and $UE_2$ cancels the interference received from TP1. With bidirectional interference cancellation, $UE_1$ served by $TP_1$ and $UE_2$ served by $TP_2$ exchange their decoded signals via D2D link. Both UEs can cancel the signal received from interfering TP.

If $UE_1$ is not able to decode its own signal, it may send soft information along with its channel to its serving TP via D2D link to $UE_2$. Using a combination of soft information obtained from D2D and cellular links, $UE_2$ served by $TP_2$ decodes the signal targeted to $UE_1$ then cancels this interference from its own received signal. Multiple iterations can be performed up to a selected maximum number of iterations.

An embodiment can be extended to more than two UEs (and two interfering TPs). An embodiment can be extended to two or more UEs served by the same TP or virtual cell (cloud radio access network (CRAN) context).

In an embodiment, high-power bandwidth resources can be semi-statically configured by the CRAN controller. UEs can be configured to use high/low power amplifier (PA) levels through radio resource control (RRC) signaling.

Figure 13:
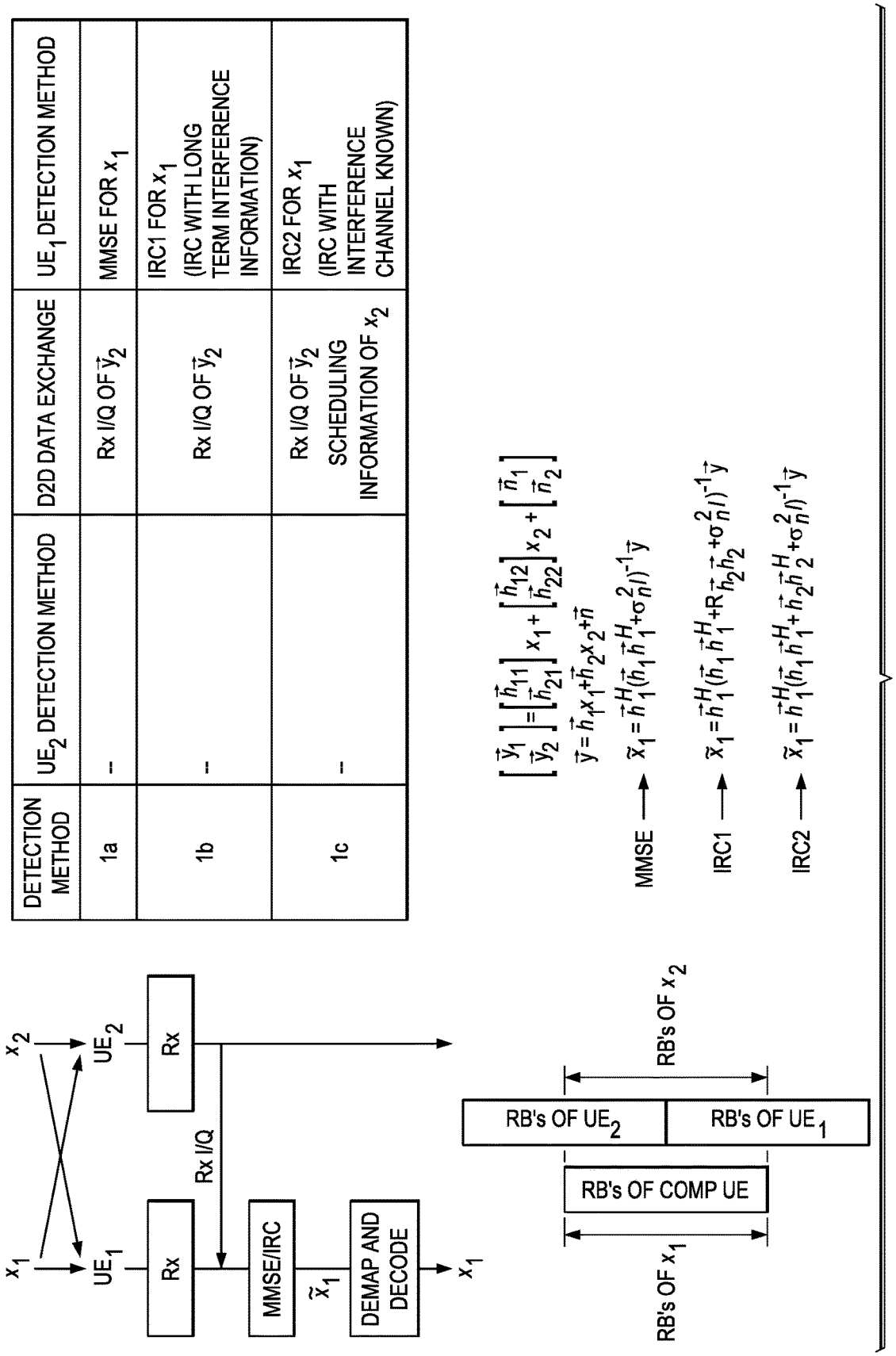
FIG. 13 illustrates a diagram of an embodiment single step detection scheme.

FIG. 13 illustrates a single step detection scheme for achieving interference cancellation by communicating hard or soft information over a D2D link. As shown, UE1 receives a first signal (e.g., y1) carrying a first data transmission (e.g., from x1) and a second data transmission (e.g., from x2), and UE2 receives a second signal (e.g., y2) carrying the first data transmission and the second data transmission. The first and second data transmissions are communicated over the same resources. Thereafter, UE2 sends all (or a portion) of the unprocessed second signal (y2) and/or related scheduling information to the UE1. The UE1 then performs interference cancellation on the first signal using the information received from the UE2, thereby isolating (at least partially) the first data transmission from the second data transmission. The UE2 then decodes and de-maps the first data transmission.

Figure 14A:
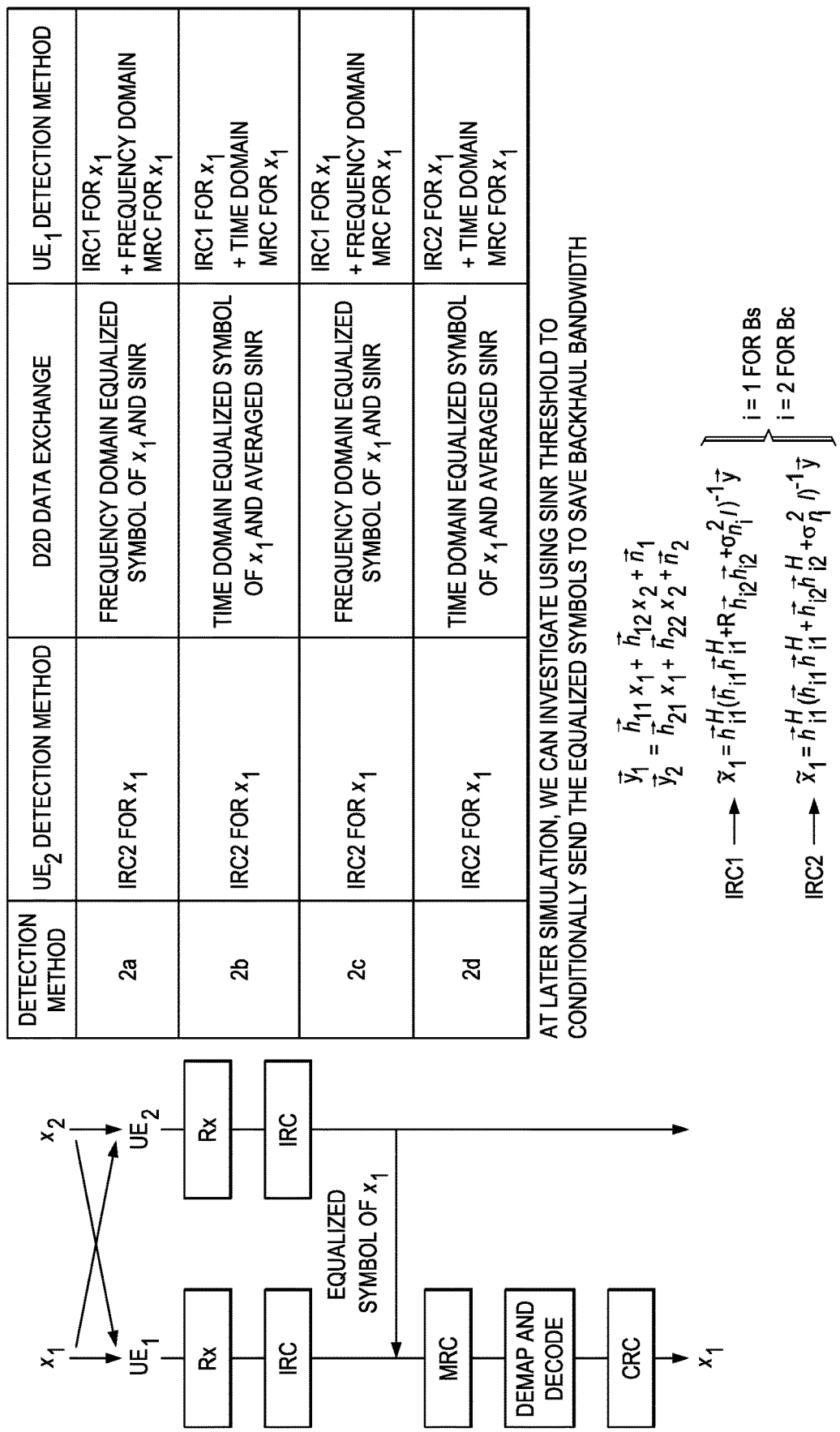
FIGS. 14A-14M illustrate diagrams of embodiment dual step detection schemes.
Figure 14B:
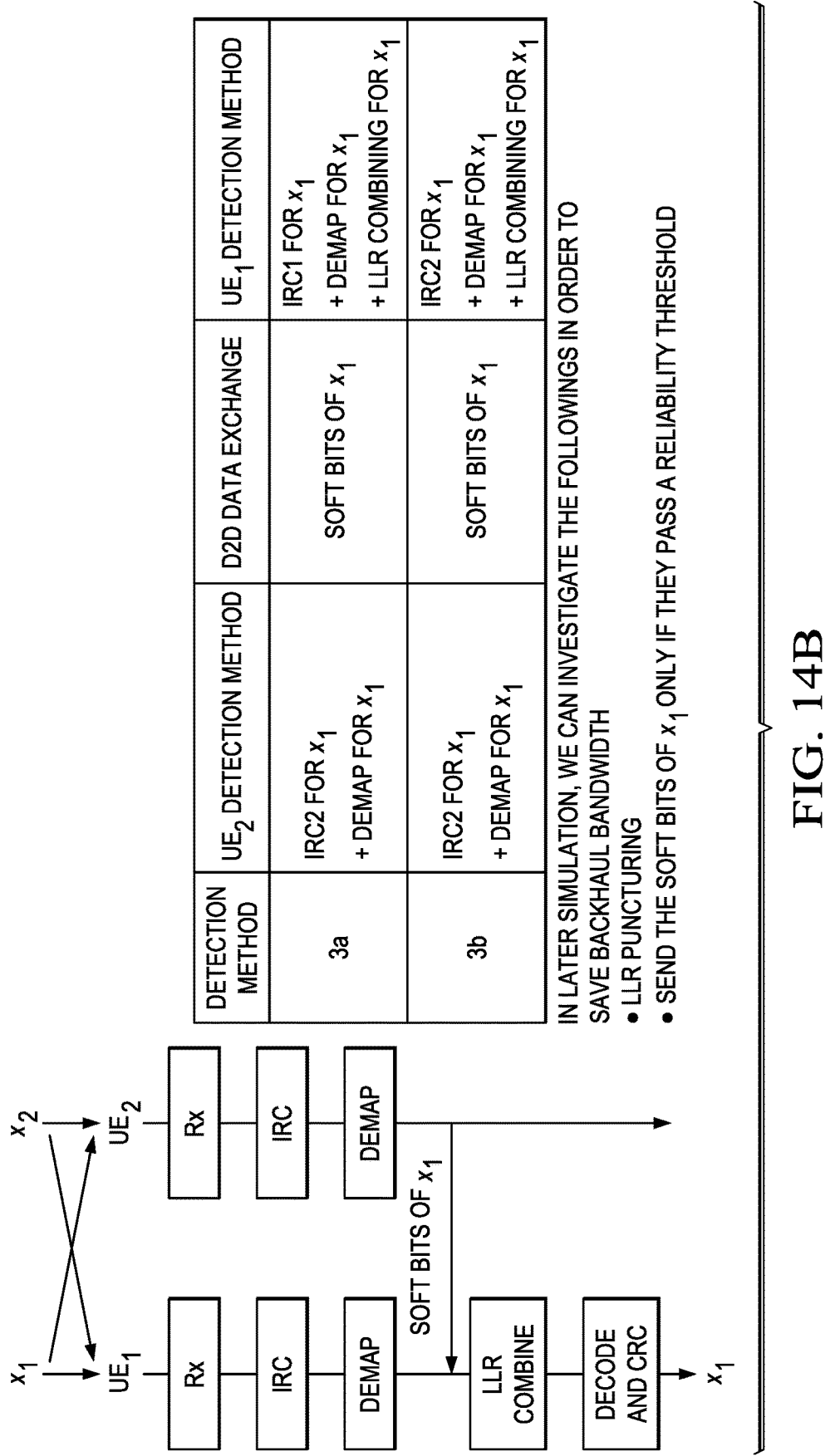
Figure 14C:
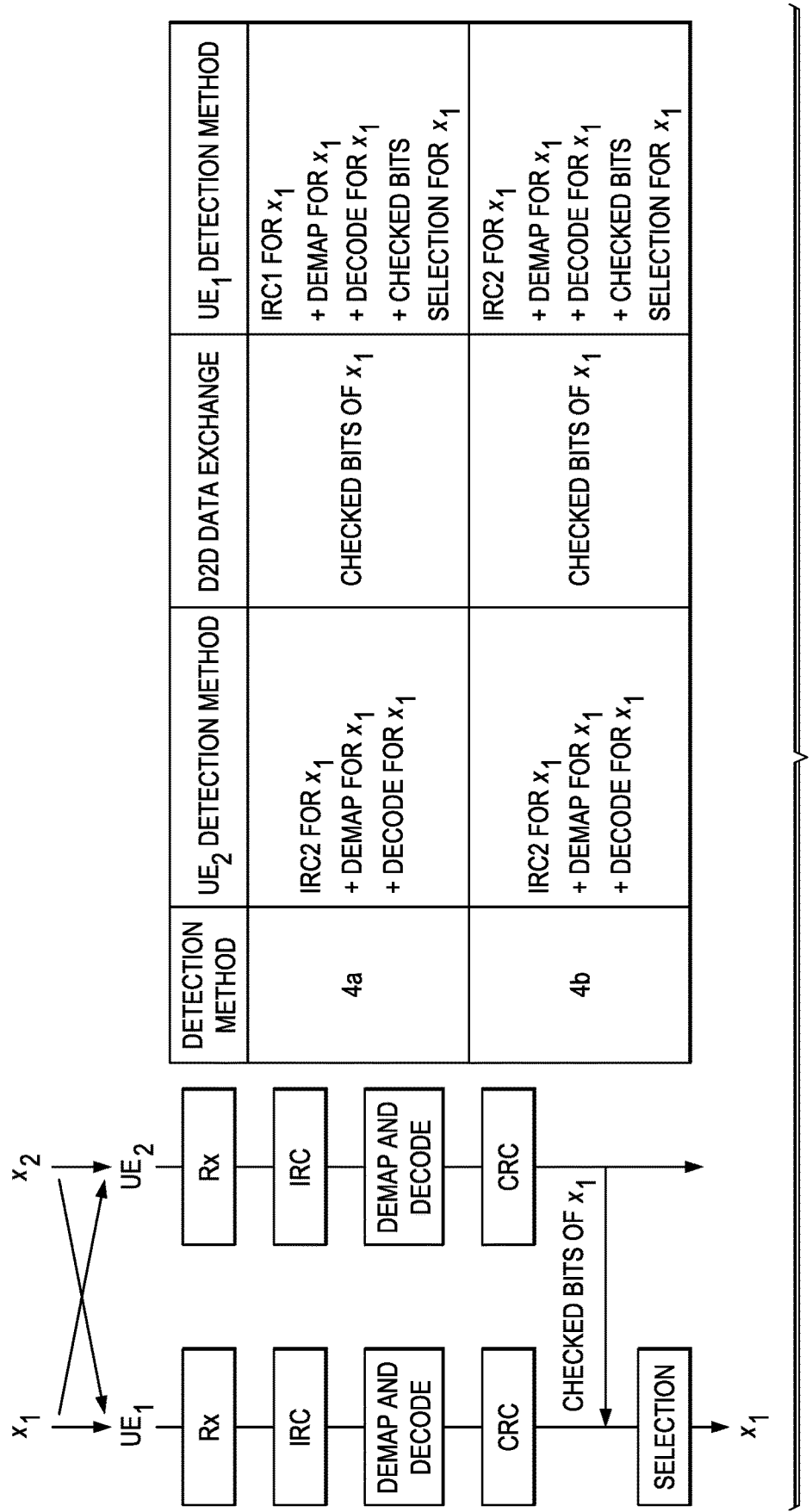
Figure 14D:
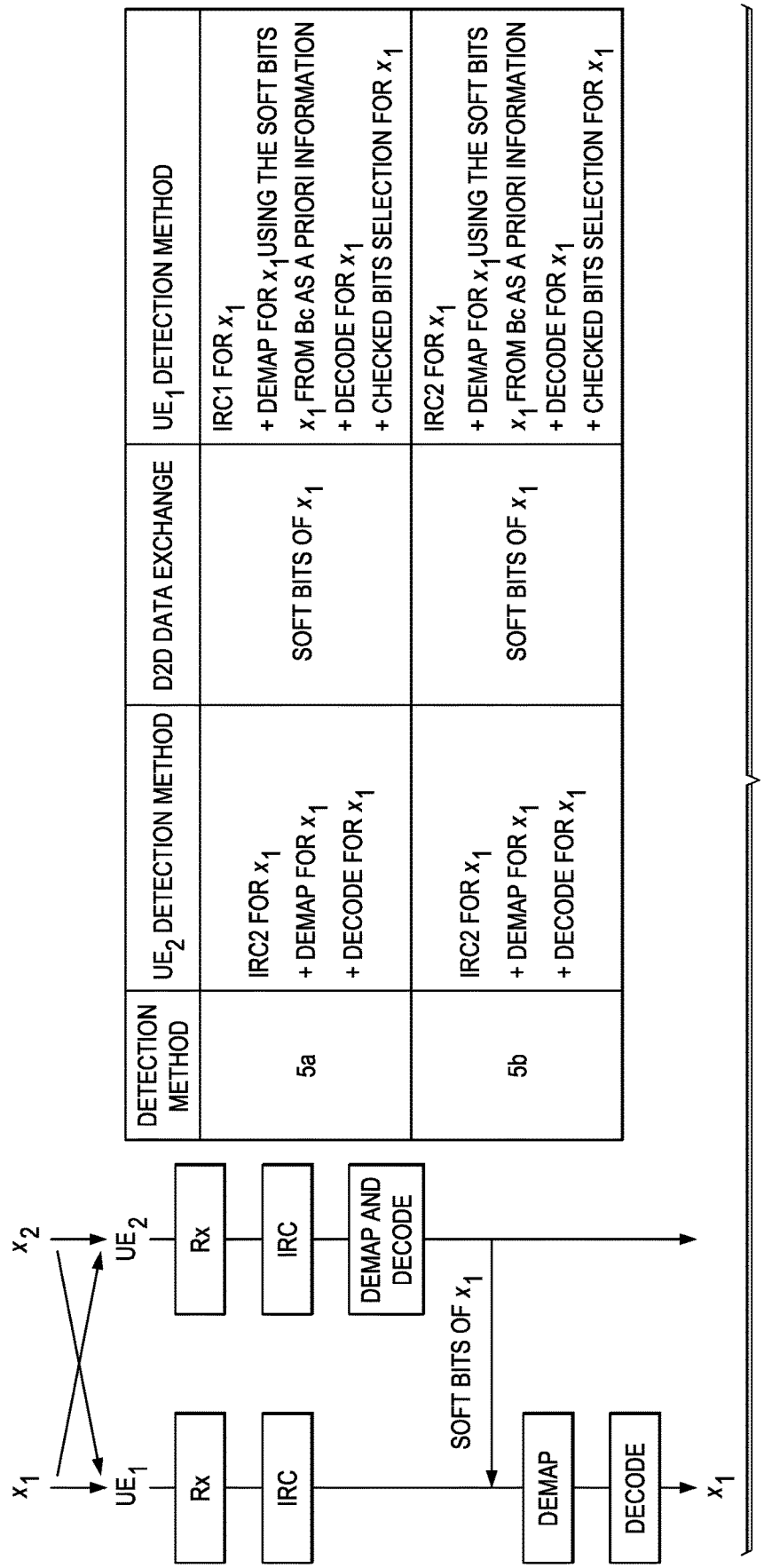
Figure 14E:
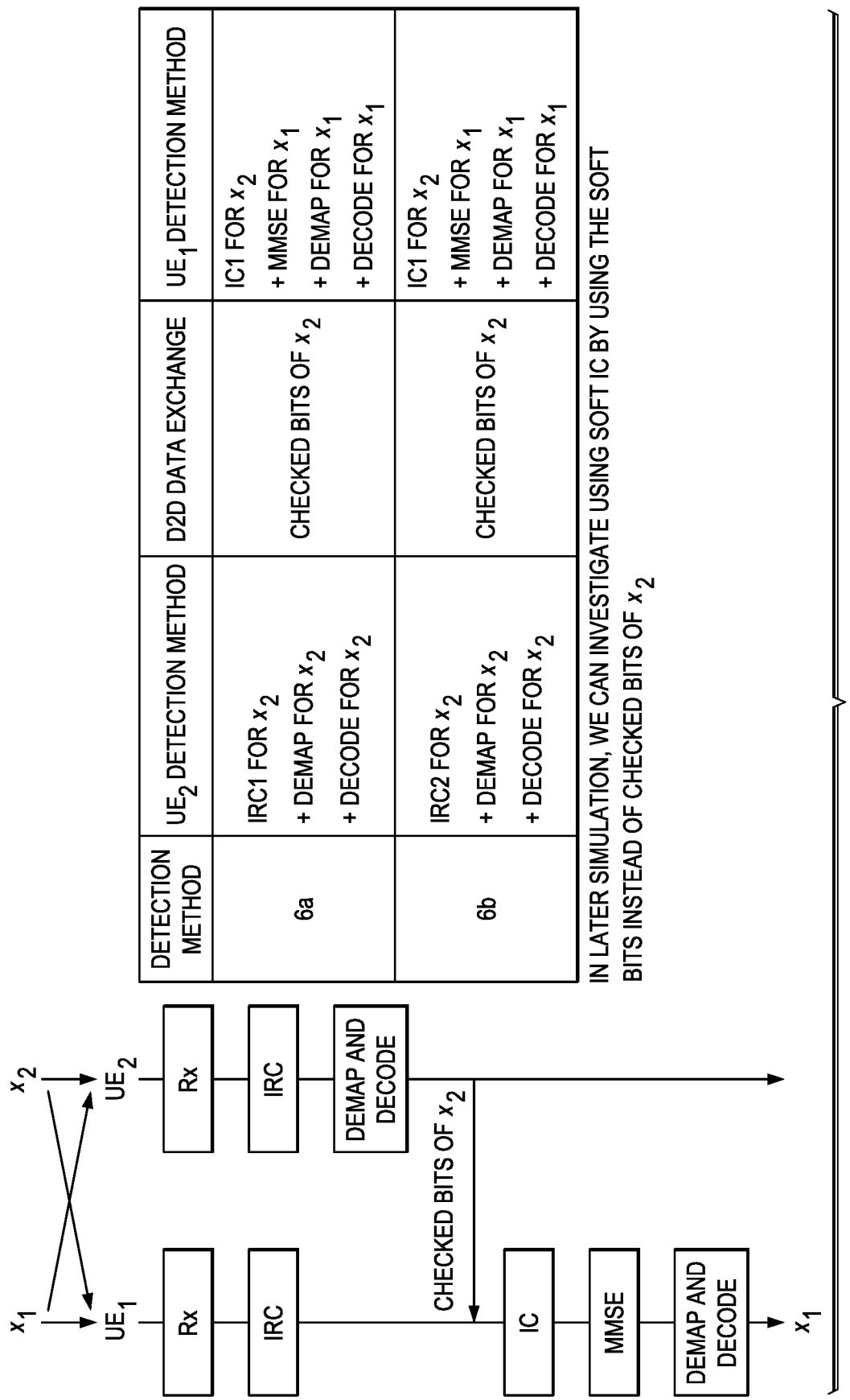

FIGS. 14A-14M illustrate dual step detection schemes for achieving interference cancellation by communicating hard or soft information over a D2D link. Dual step detection differs from single step detection in that the UE2 performs at least some processing on the second signal (y2) prior to sending information over the D2D link. The processing may include processing steps performed on the second data transmission, the first data transmission, or both. In one embodiment, the processing performed by the UE2 includes performing interference rejection combining (IRC) on the second transmission signal, as shown in FIG. 14A. In another embodiment, the processing performed by the UE2 includes performing IRC and de-mapping on the second transmission signal, as shown in FIG. 14B. In yet another embodiment, the processing performed by the UE2 includes performing IRC, de-mapping, and cyclic redundancy checks (CRCs) on the second transmission signal, as shown in FIG. 14C. In yet another embodiment, the processing performed by the UE2 includes performing IRC, de-mapping, and decoding on the second transmission signal, as shown in FIGS. 14D-14E.

Figure 14F:
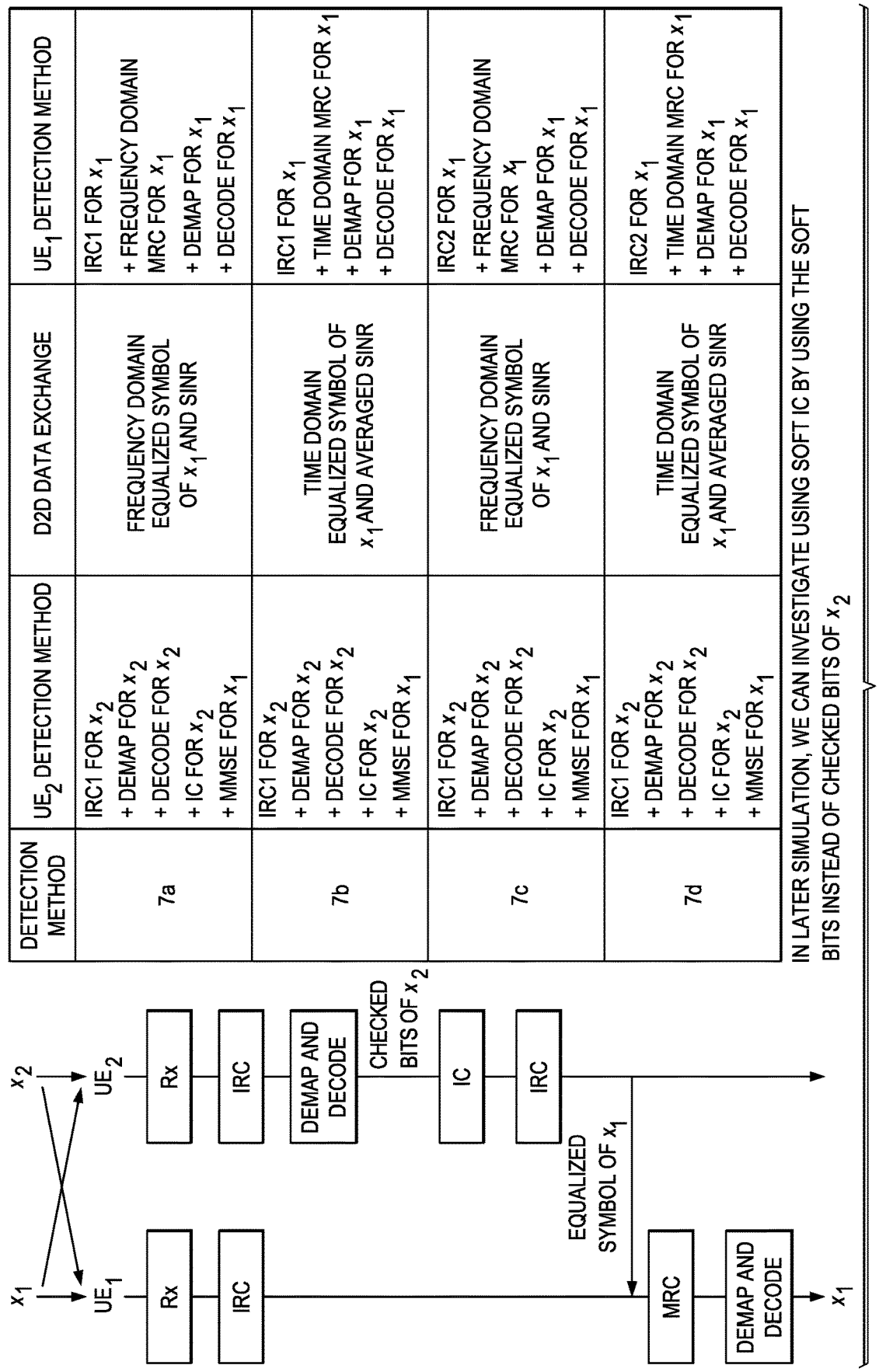
Figure 14G:
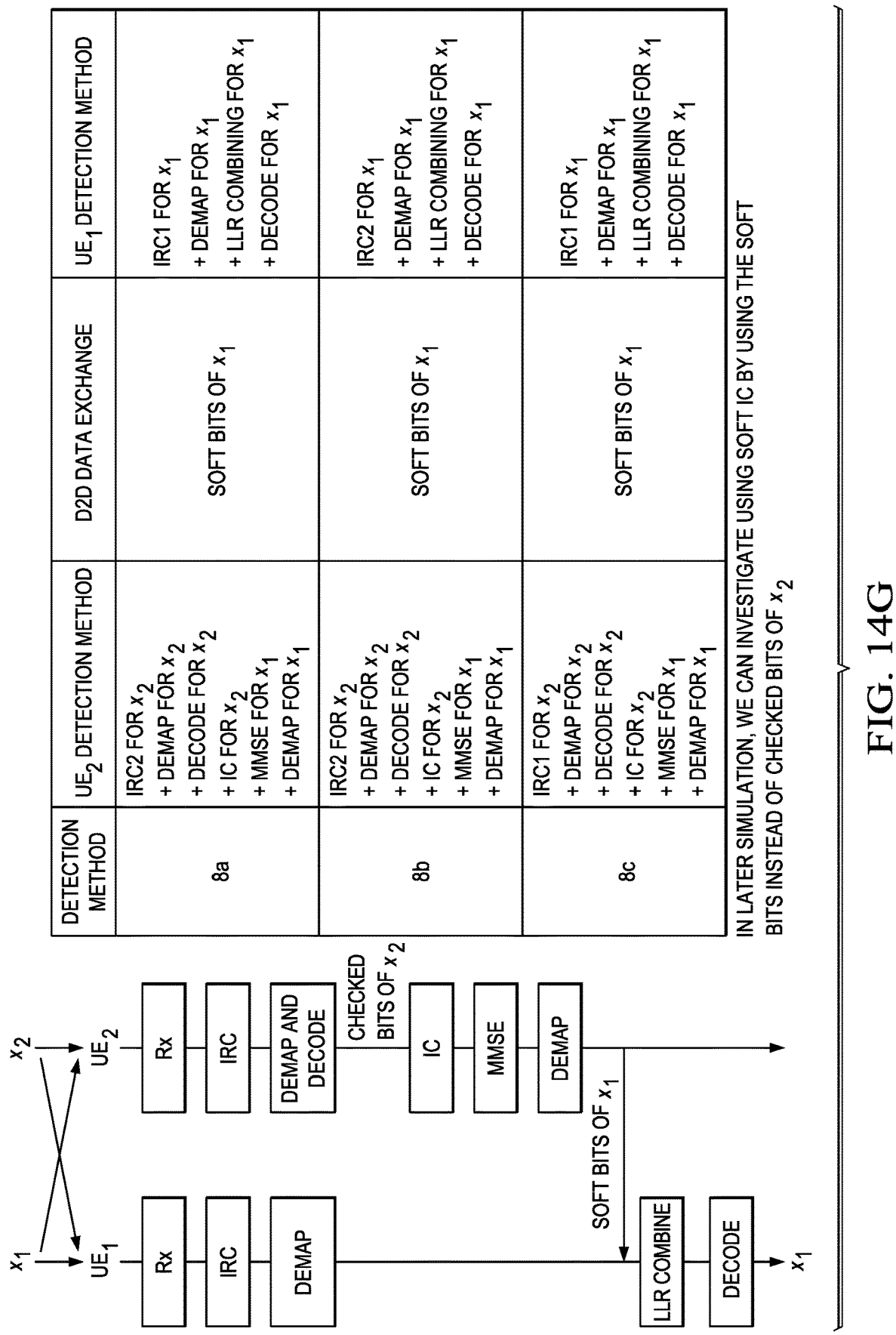
Figure 14H:
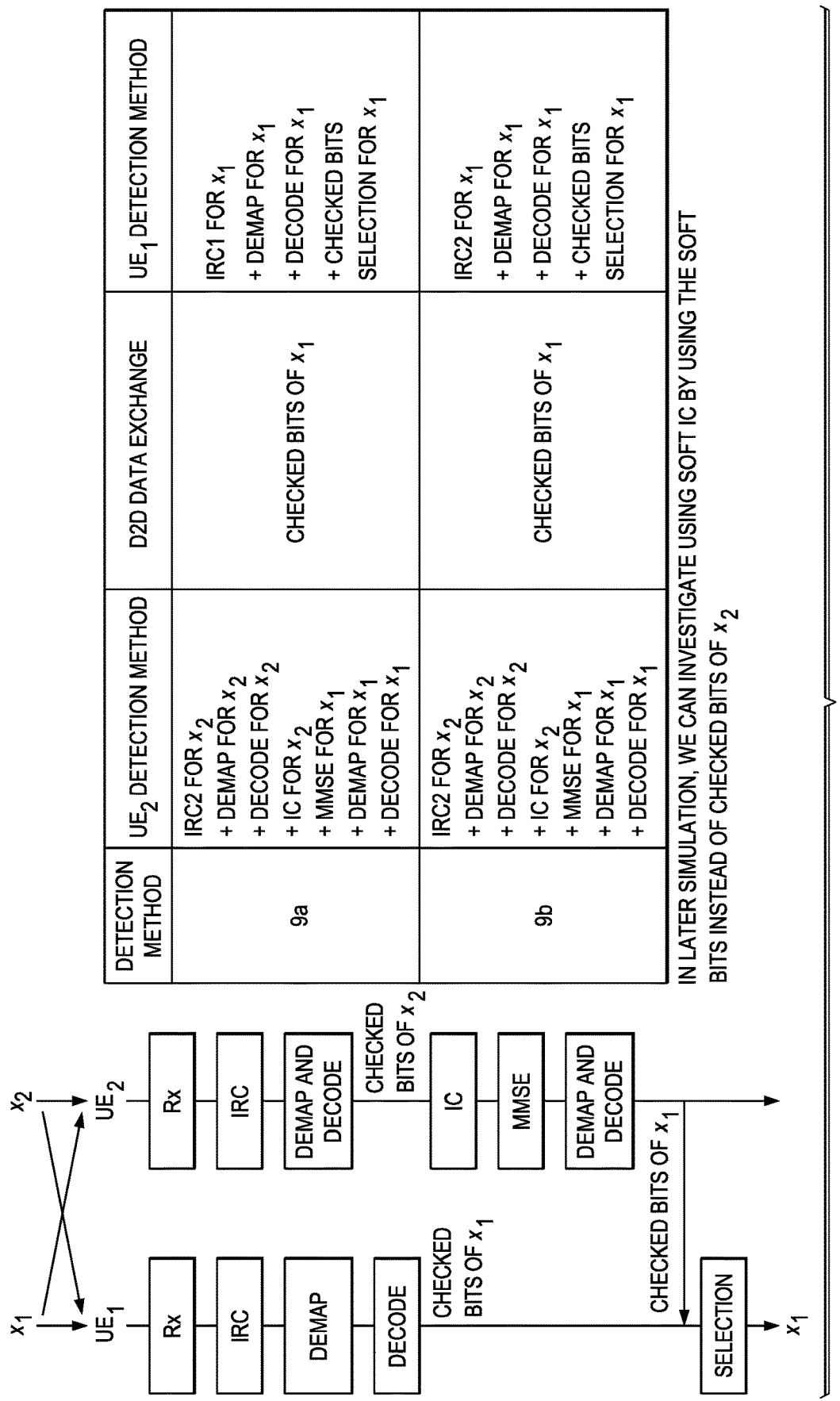
Figure 14I:
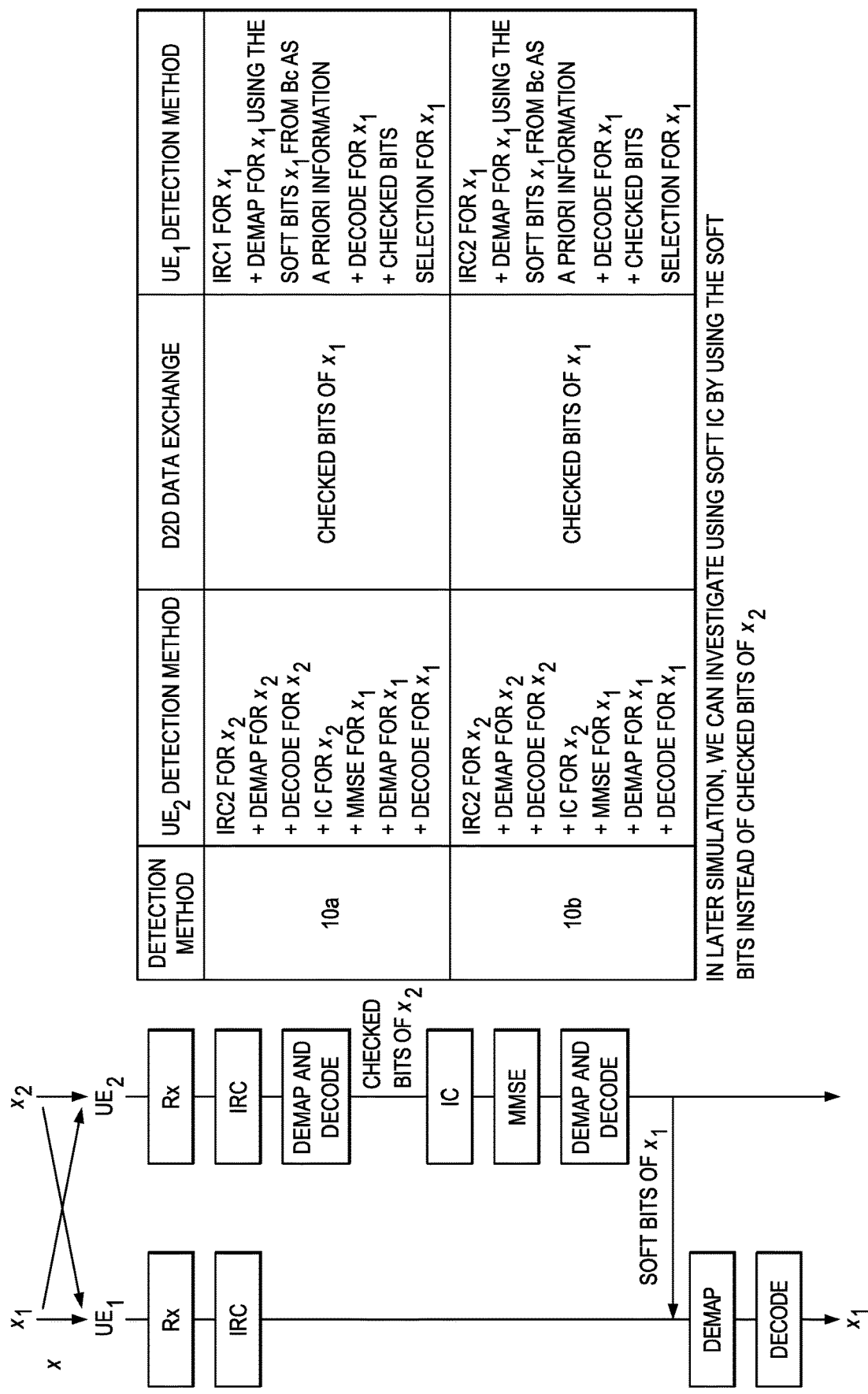
Figure 14J:
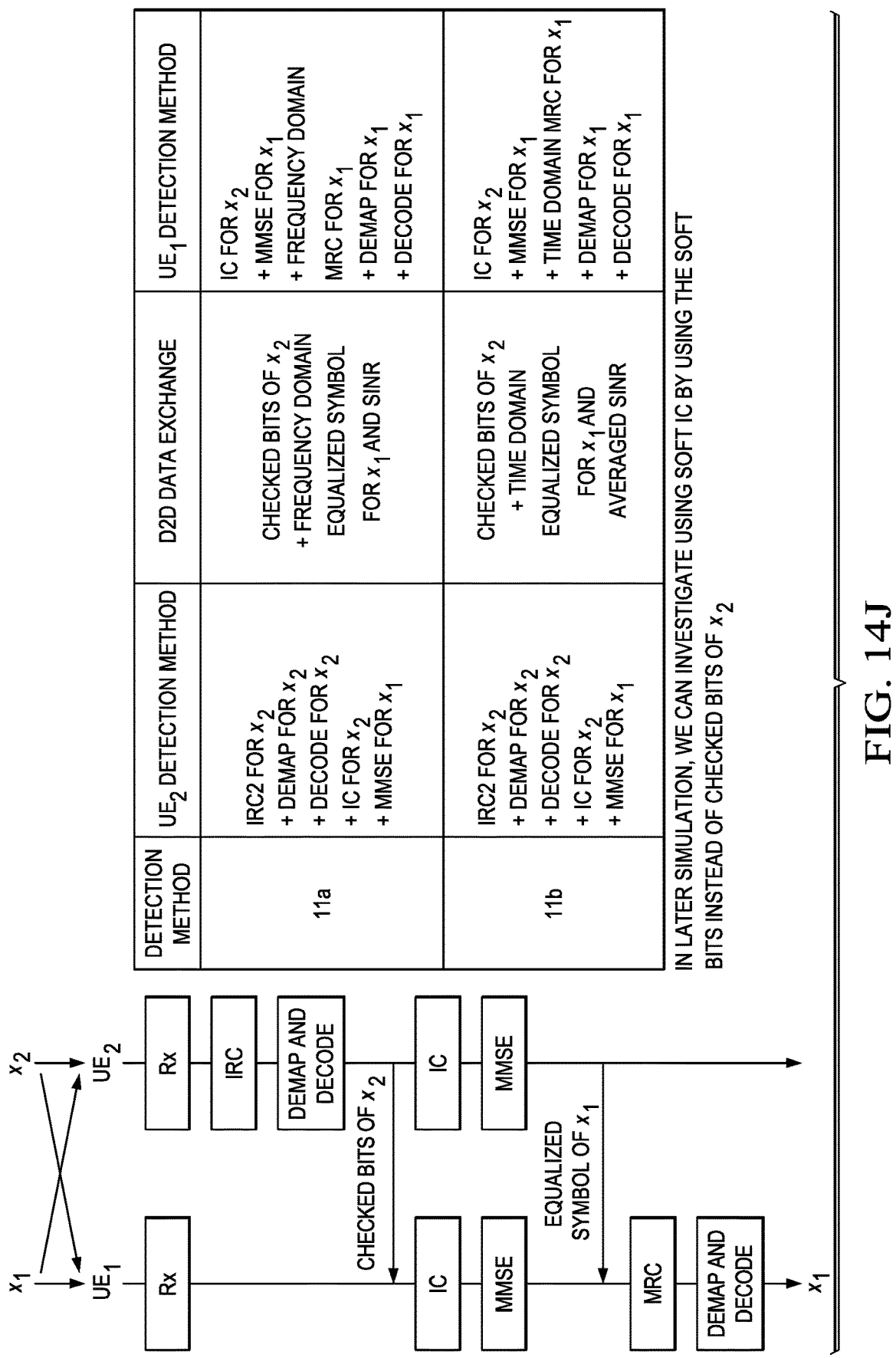
Figure 14K:
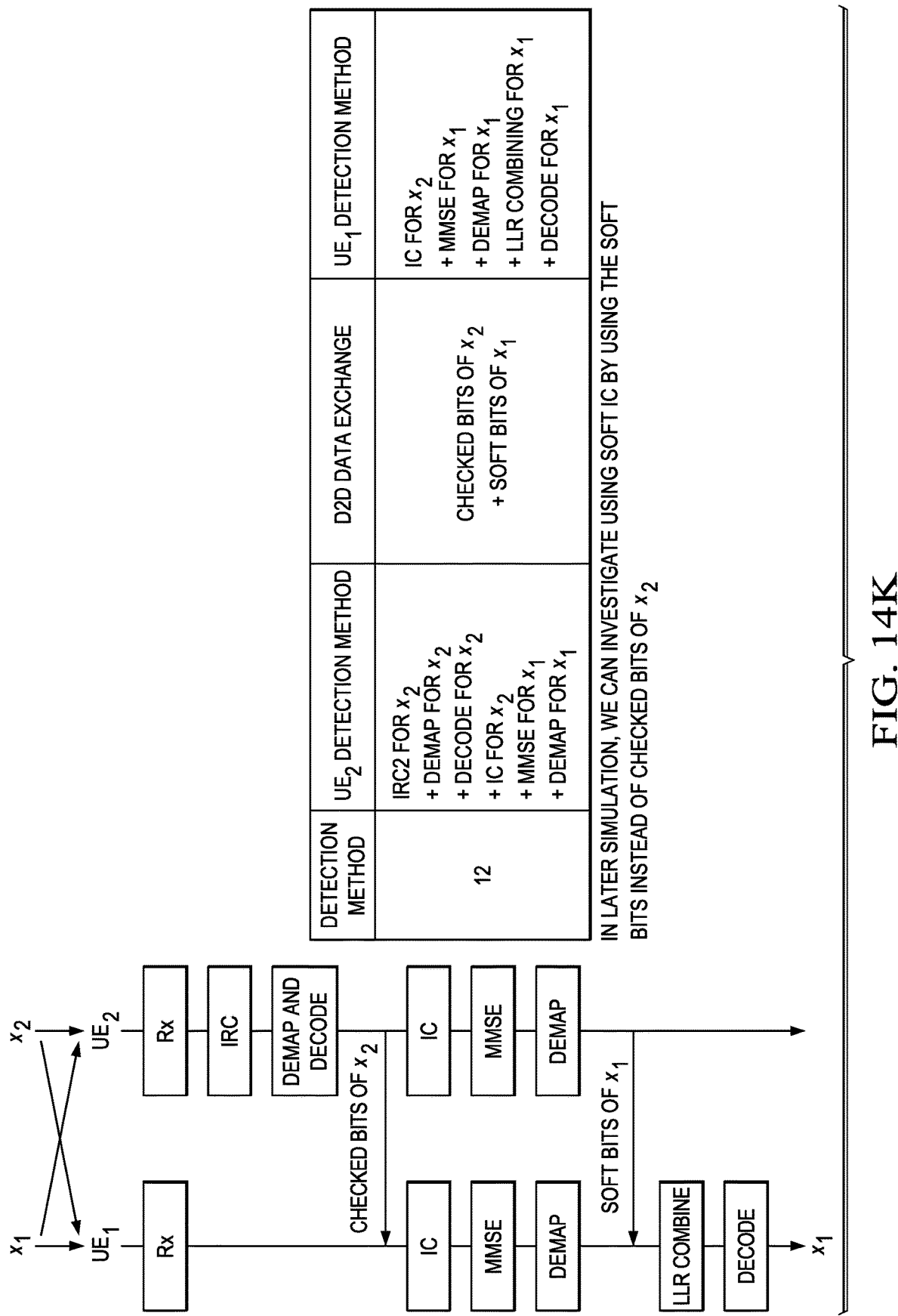
Figure 14L:
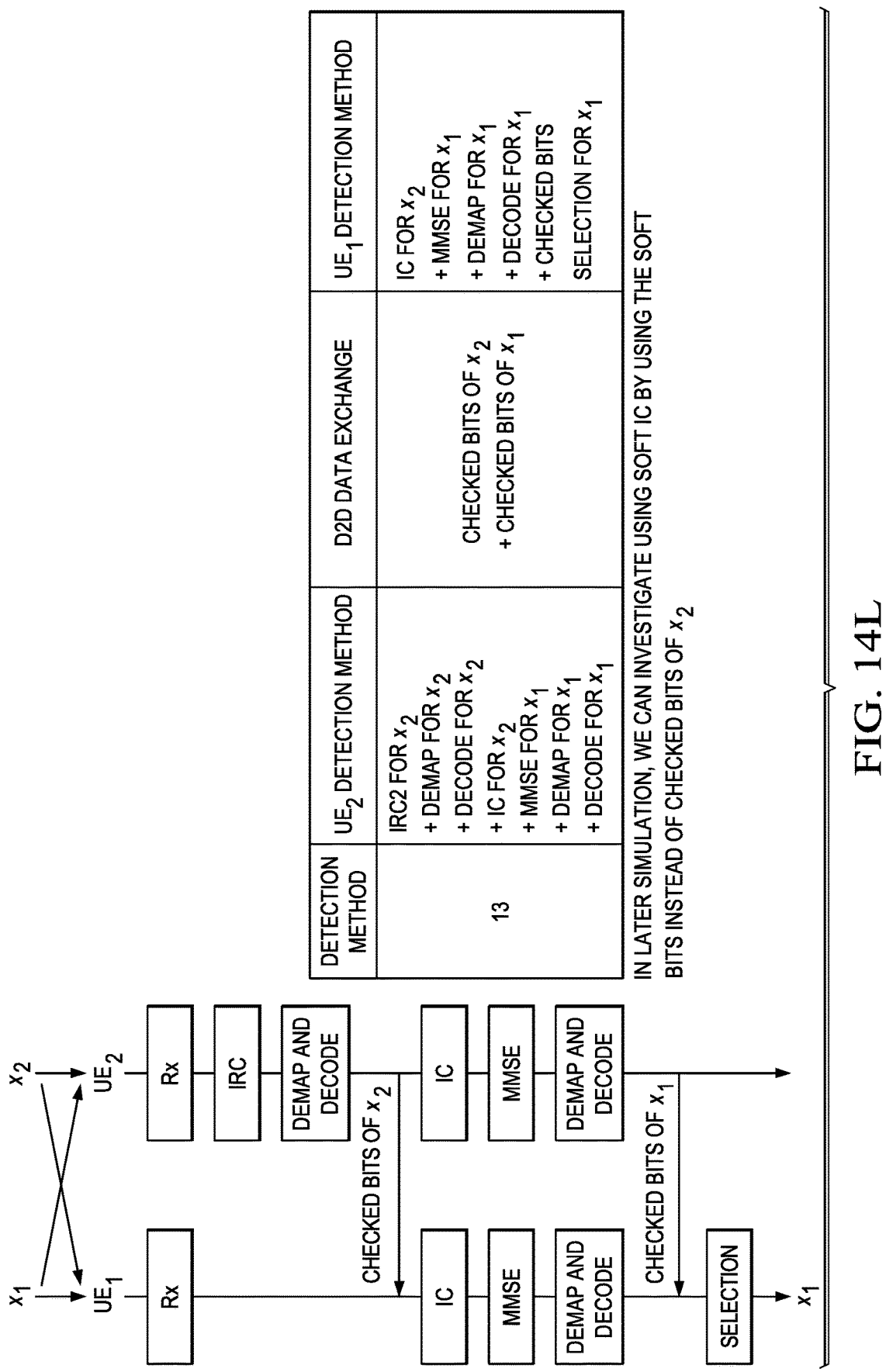
Figure 14M:
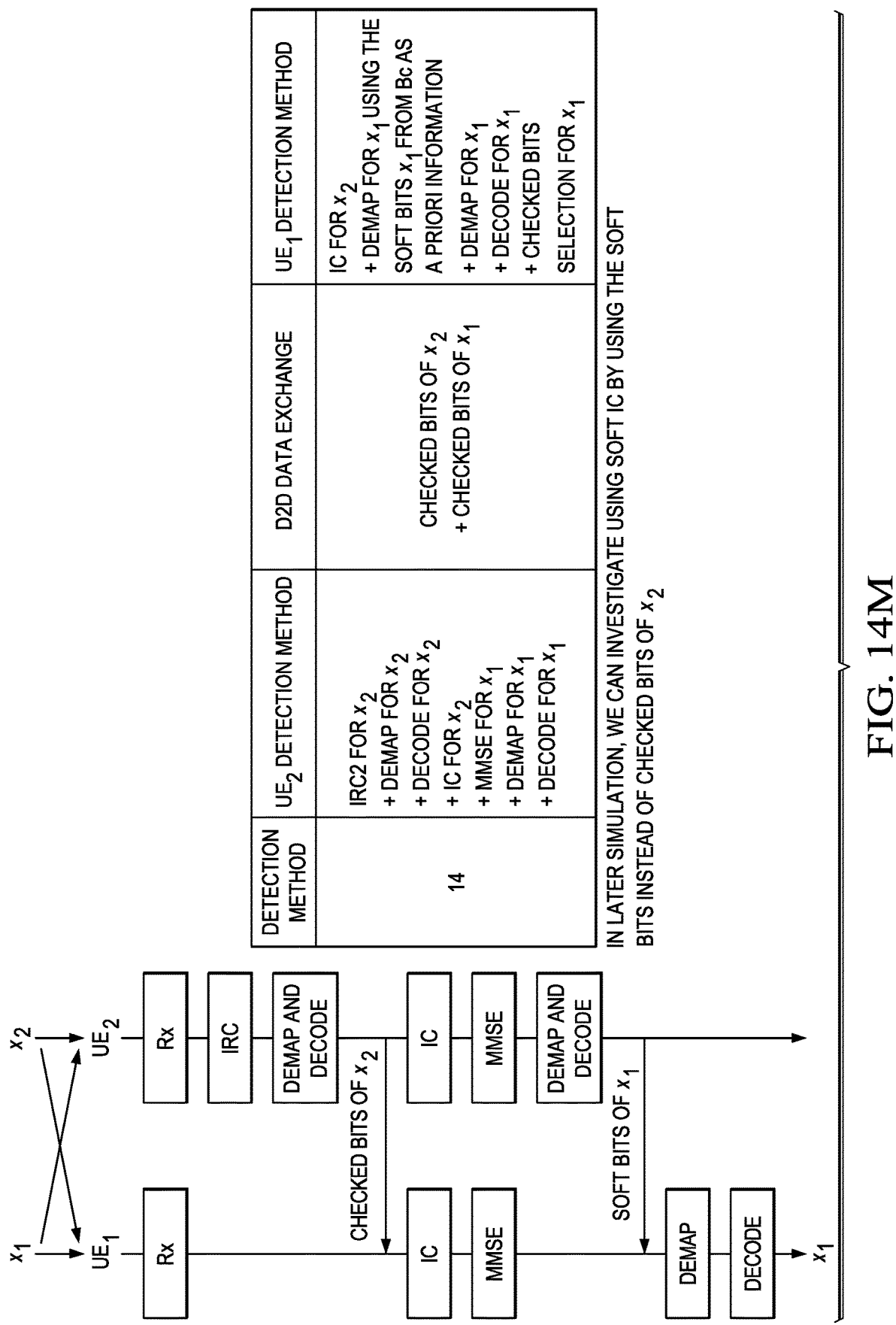

The processing performed by the UE2 may include processing steps performed on the first transmission signal, which may (in some cases) utilize information obtained from earlier processing performed on the second transmission signal. In an embodiment, the UE2 performs interference cancellation and IRC on the first transmission signal, as shown in FIG. 14F. In another embodiment, the UE2 performs interference cancellation, minimum mean square error (MMSE) detection, and de-mapping on the first transmission signal, as shown in FIG. 14G. In yet another embodiment, the UE2 performs interference cancellation, MMSE detection, de-mapping, and decoding on the first transmission signal, as shown in FIGS. 14H-14I. In yet another embodiment, the UE2 performs interference cancellation, MMSE detection, de-mapping, and decoding on the first transmission signal, as shown in FIGS. 14H-14I. In some embodiments, the UE2 may communicate information related to both the first transmission and the second transmission over the D2D link, as shown in FIGS. 14J-14L.

Figure 15:
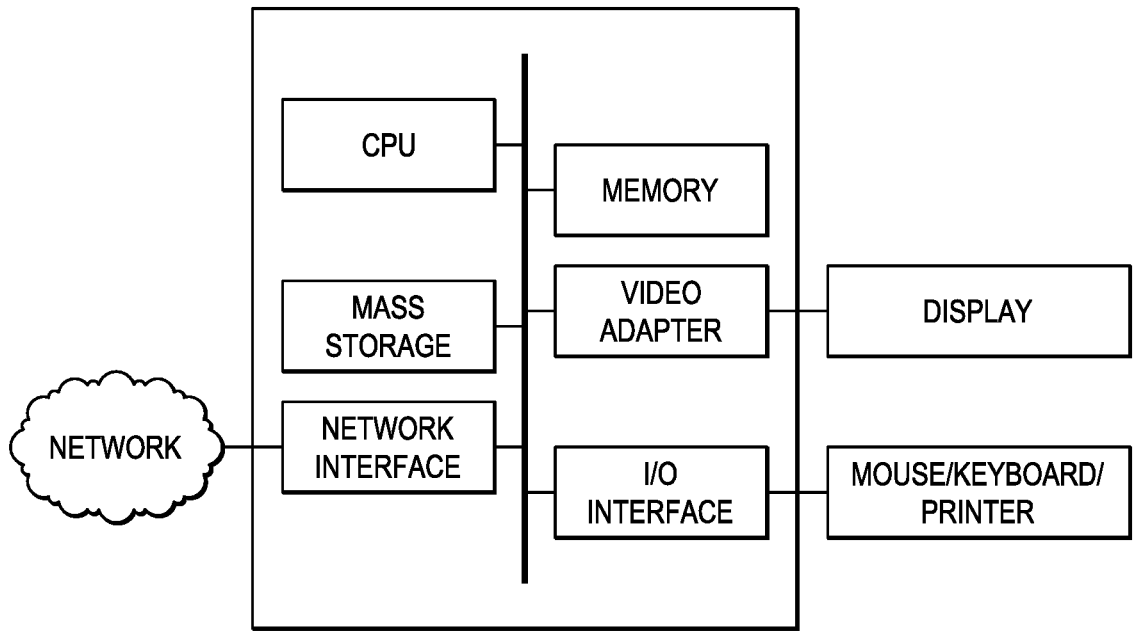
FIG. 15 illustrates a diagram of an embodiment computing platform.

FIG. 15 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 16:
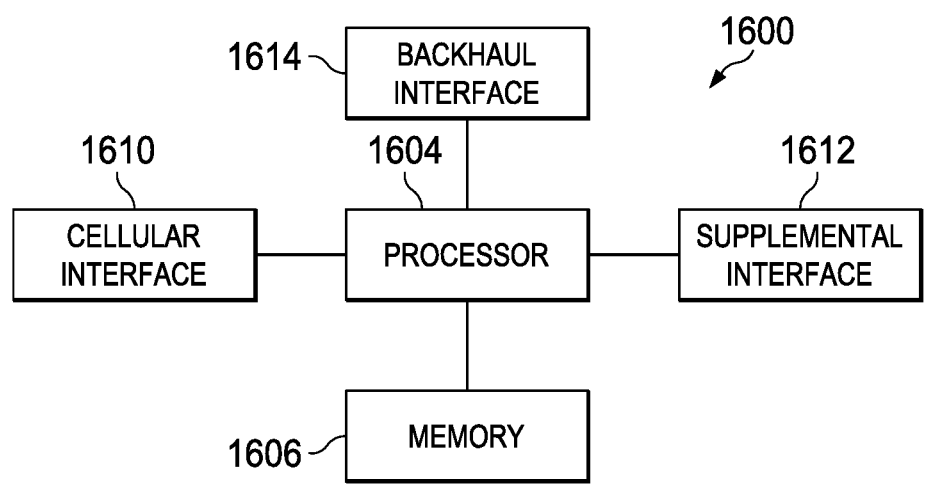
FIG. 16 illustrates a diagram of an embodiment communications device.

FIG. 16 illustrates a block diagram of an embodiment of a communications device 1600, which may be equivalent to one or more devices (e.g., UEs, NBs, etc.) discussed above. The communications device 1600 may include a processor 1604, a memory 1606, a cellular interface 1610, a supplemental interface 1612, and a backhaul interface 1614, which may (or may not) be arranged as shown in FIG. 16. The processor 1604 may be any component capable of performing computations and/or other processing related tasks, and the memory 1606 may be any component capable of storing programming and/or instructions for the processor 1604. The cellular interface 1610 may be any component or collection of components that allows the communications device 1600 to communicate using a cellular signal, and may be used to receive and/or transmit information over a cellular connection of a cellular network. The supplemental interface 1612 may be any component or collection of components that allows the communications device 1600 to communicate data or control information via a supplemental protocol. For instance, the supplemental interface 1612 may be a non-cellular wireless interface for communicating in accordance with a Wireless-Fidelity (Wi-Fi) or Bluetooth protocol. Alternatively, the supplemental interface 1612 may be a wireline interface. The backhaul interface 1614 may be optionally included in the communications device 1600, and may comprise any component or collection of components that allows the communications device 1600 to communicate with another device via a backhaul network.

The following references are related to subject matter of the present application. Each of these references is incorporated herein by reference in its entirety: LTE, Evolved Universal Terrestrial Radio Access (E-UTRA), Physical layer procedures (3GPP TS 36.213 v. 11.1.0 Rel. 11), Section 7.1.6 (February 2013); Chang, Ronald Y., et al. "Multicell OFDMA downlink resource allocation using a graphic framework." Vehicular Technology, IEEE Transactions on 58.7, 3494-3507 (2009); Sadr, Sanam, and Raviraj Adve. "Hierarchical Resource Allocation in Femtocell Networks using Graph Algorithms." arXiv preprint arXiv: 1202.5528 (2012); Chang, Ronald Y., et al. "Dynamic fractional frequency reuse (D-FFR) for multicell OFDMA networks using a graph framework." Wireless Communications and Mobile Computing (2011); Uygungelen, Serkan, Gunther Auer, and Zubin Bharucha. "Graph-based dynamic frequency reuse in femtocell networks." Vehicular Technology Conference (VTC Spring), IEEE 73$^{rd}$ (2011); Mao, Xuehong, Amine Maaref, and Koon Hoo Teo. "Adaptive soft frequency reuse for inter-cell interference coordination in SC-FDMA based 3GPP LTE uplinks." Global Telecommunications Conference, 2008. IEEE GLOBECOM 2008.

While embodiments of this disclosure have been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method of pairing user equipments (UEs) for interference cancellation, the method comprising:
   identifying a plurality of UEs residing in one or more coverage areas of one or more transmit points;
   pairing a first UE in the plurality of UEs with a second UE in the plurality of UEs, wherein the first UE is scheduled to receive a first transmission over the same radio resource in which the second UE is scheduled to receive a second transmission; and
   prompting the first UE and the second UE to exchange information over a device to device (D2D) link, wherein the information is used to decode at least one of the first transmission and the second transmission in accordance with an interference cancellation technique.

2. The method of claim 1, wherein prompting the first UE and the second UE to exchange information over the D2D link comprises:
   communicating pairing information to the one or more transmit points, the pairing information specifying one or more UE pairings, and wherein the pairing information is relayed to the plurality of UEs by the one or more transmit points.

3. The method of claim 1, wherein pairing the first UE with the second UE comprises:
   deciding to pair the first UE with the second UE in accordance with a proximity of the first UE to the second UE.

4. The method of claim 1, wherein pairing the first UE with the second UE comprises:
   deciding to pair the first UE with the second UE in accordance with scheduling metrics.

5. The method of claim 1, wherein the first transmission and the second transmission originate from the same transmit point.

6. The method of claim 1, wherein the first transmission and the second transmission originate from different transmit points.

7. The method of claim 1, wherein the first transmission and the second transmission are jointly transmitted from at least two different transmit points.

8. The method of claim 1, wherein pairing the first UE in the plurality of UEs with the second UE in the plurality of UEs comprises:
- constructing an inter-cell aware (IC-aware) interference graph, the IC-aware interference graph indicating which transmit point interfere with one another and which UEs in the plurality of UEs are capable of performing coordinated interference cancellation with one another; and
- pairing the first UE with the second UE in accordance with the IC-aware interference graph.

9. The method of claim 1, further comprising:
- sending scheduling information of the first UE to the second UE; and
- sending scheduling information of the second UE to the first UE.

10. An apparatus comprising:
- a processor; and
- a non-transitory computer readable storage medium storing programming for execution by the processor, the programming including instructions to:
  - identify a plurality of user equipments (UEs) residing in one or more coverage areas of one or more transmit points;
  - pair a first UE in the plurality of UEs with a second UE in the plurality of UEs, wherein the first UE is scheduled to receive a first transmission over the same radio resource in which the second UE is scheduled to receive a second transmission; and
  - prompt the first UE and the second UE to exchange information over a device to device (D2D) link, wherein the information is used to decode at least one of the first transmission and the second transmission in accordance with an interference cancellation technique.

11. The apparatus of claim 10, wherein the instructions to prompt the first UE and the second UE to exchange information over the D2D link include instructions to:
- communicate pairing information to the one or more transmit points, the pairing information specifying one or more UE pairings, and wherein the pairing information is relayed to the plurality of UEs by the one or more transmit points.

12. The apparatus of claim 10, wherein the instructions to pair the first UE with the second UE include instructions to:
- decide to pair the first UE with the second UE in accordance with a proximity of the first UE to the second UE.

13. The apparatus of claim 10, wherein the instructions to pair the first UE with the second UE include instructions to:
- decide to pair the first UE with the second UE in accordance with scheduling metrics.

14. The apparatus of claim 10, wherein the first transmission and the second transmission originate from the same transmit point.

15. The apparatus of claim 10, wherein the first transmission and the second transmission originate from different transmit points.

16. The apparatus of claim 10, wherein the first transmission and the second transmission are jointly transmitted from at least two different transmit points.

17. The apparatus of claim 10, wherein the instructions to pair the first UE in the plurality of UEs with the second UE in the plurality of UEs include instructions to:
- construct an inter-cell aware (IC-aware) interference graph, the IC-aware interference graph indicating which transmit point interfere with one another and which UEs in the plurality of UEs are capable of performing coordinated interference cancellation with one another; and
- pair the first UE with the second UE in accordance with the IC-aware interference graph.

18. The apparatus of claim 10, wherein the programming further includes instructions to:
- send scheduling information of the first UE to the second UE; and
- send scheduling information of the second UE to the first UE.

* * * * *